(12) United States Patent
Kami et al.

(10) Patent No.: US 9,797,111 B2
(45) Date of Patent: Oct. 24, 2017

(54) WORK VEHICLE

(71) Applicant: KOMATSU LTD., Tokyo (JP)

(72) Inventors: Yoshiki Kami, Hadano (JP); Takeo Yamada, Komatsu (JP)

(73) Assignee: KOMATSU LTD., Tokyo (JP)

( * ) Notice: Subject to any disclaimer, the term of this patent is extended or adjusted under 35 U.S.C. 154(b) by 189 days.

(21) Appl. No.: 14/408,370

(22) PCT Filed: Sep. 10, 2014

(86) PCT No.: PCT/JP2014/074009
§ 371 (c)(1),
(2) Date: Dec. 16, 2014

(87) PCT Pub. No.: WO2015/025988
PCT Pub. Date: Feb. 26, 2015

(65) Prior Publication Data
US 2016/0265186 A1    Sep. 15, 2016

(51) Int. Cl.
*E02F 3/43*       (2006.01)
*E02F 9/22*       (2006.01)
*E02F 9/20*       (2006.01)
*E02F 9/26*       (2006.01)
*E02F 3/32*       (2006.01)

(52) U.S. Cl.
CPC .............. *E02F 3/437* (2013.01); *E02F 3/435* (2013.01); *E02F 9/2004* (2013.01); *E02F 9/2033* (2013.01); *E02F 9/2203* (2013.01); *E02F 9/2207* (2013.01); *E02F 9/2228* (2013.01); *E02F 9/2285* (2013.01); *E02F 9/262* (2013.01);
(Continued)

(58) Field of Classification Search
CPC . E02F 3/32; E02F 3/437; E02F 9/2004; E02F 9/2012; E02F 9/2203; E02F 9/2228; E02F 9/2285; E02F 9/265
See application file for complete search history.

(56) References Cited

U.S. PATENT DOCUMENTS

| 7,729,833 B2 | 6/2010 | Brickner et al. |
| 2008/0244937 A1 | 10/2008 | Florean |

(Continued)

FOREIGN PATENT DOCUMENTS

| CN | 201883466 U | 6/2011 |
| CN | 102493508 A | 6/2012 |

(Continued)

*Primary Examiner* — Dale Moyer
(74) *Attorney, Agent, or Firm* — Drinker Biddle & Reath LLP

(57) ABSTRACT

A work vehicle includes an arm. An arm cylinder drives the arm. A direction control valve operates the arm cylinder by allowing supply of a hydraulic oil to the arm cylinder as a spool moves. An oil path is connected to the direction control valve. A pilot oil for moving the spool flows through the oil path. A proportional solenoid valve for arm excavation is provided in the oil path. An arm control member is provided for an operator to operate drive of the arm. An amount of operation of the arm control member is equal to or smaller than a prescribed value in a first operation state and greater than the prescribed value in a second operation state. A command current instructing an opening of the proportional solenoid valve for arm excavation is set to a constant value in the first operation state.

4 Claims, 17 Drawing Sheets

(52) U.S. Cl.
CPC ........ *E02F 3/32* (2013.01); *G05B 2219/2616* (2013.01)

(56) References Cited

U.S. PATENT DOCUMENTS

| | | |
|---|---|---|
| 2013/0158789 A1 | 6/2013 | Seki |
| 2013/0195597 A1* | 8/2013 | Imura ................... E02F 9/123 414/744.2 |
| 2014/0090367 A1* | 4/2014 | Hijikata ................ E02F 9/2091 60/414 |
| 2014/0142817 A1 | 5/2014 | Matsuyama |
| 2014/0297040 A1 | 10/2014 | Baba et al. |

FOREIGN PATENT DOCUMENTS

| | | |
|---|---|---|
| CN | 102864800 A | 1/2013 |
| CN | 103080427 A | 5/2013 |
| DE | 696 20 565 T2 | 9/2002 |
| EP | 0787862 B1 | 4/2002 |
| JP | 5-195554 A | 8/1993 |
| JP | H09-328774 A | 12/1997 |
| JP | 2001-020325 A | 1/2001 |
| JP | 2007-315126 A | 12/2007 |
| JP | 5548306 B2 | 7/2014 |
| WO | WO 2007/014985 A1 | 8/2007 |
| WO | WO 2014/061790 | 4/2014 |

* cited by examiner (A)

(B)

TARGET EXCAVATION TOPOGRAPHY U (B)

(C)

WORK VEHICLE

TECHNICAL FIELD

The present invention relates to a work vehicle.

BACKGROUND ART

A work vehicle such as a hydraulic excavator includes a work implement having a boom, an arm, and a bucket. In control of the work vehicle, automatic control in which a bucket is moved based on target excavation topography which is an aimed shape of an excavation target has been known.

PTD 1 has proposed a scheme for automatic control of profile work in which soil abutting to a bucket is plowed and leveled by moving a cutting edge of the bucket along a reference surface and a surface corresponding to the flat reference surface is made.

CITATION LIST

Patent Document

PTD 1: Japanese Patent Laying-Open No. 9-328774

SUMMARY OF INVENTION

Technical Problem

When an arm control lever is finely operated during profile work for work in which an arm is moved at a low speed, a cutting edge of a bucket under automatic control is unstable and hunting may be caused.

The present invention was made to solve the problem described above, and an object of the present invention is to provide a work vehicle and a method of controlling a work vehicle capable of achieving suppression of hunting.

Other tasks and novel features will become apparent from the description herein and the attached drawings.

Solution to Problem

A direction of flow and a flow rate of a hydraulic oil which flows into an arm cylinder driving an arm are determined by movement of a spool. A proportional solenoid valve is provided in an oil path through which a pilot oil for moving the spool flows and a command current to the proportional solenoid valve is controlled, so that automatic control of the arm by a controller can be carried out.

The present inventor has found such a phenomenon that a value for a command current output to the proportional solenoid valve rapidly oscillates during a fine operation of an arm control lever and estimated this phenomenon as one cause of hunting. Based on this estimation, the present inventor has formed a conception that hunting can be suppressed when a value for a command current output to a proportional solenoid valve can be stabilized, and has finally completed the present invention.

Namely, a work vehicle according to one aspect of the present invention includes a work implement, an arm cylinder, a direction control valve, an oil path, a proportional solenoid valve for arm excavation, an arm control member, a determination portion, and a setting portion. The work implement includes a boom, an arm, and a bucket. The arm cylinder drives the arm. The direction control valve has a movable spool. The direction control valve operates the arm cylinder by allowing supply of a hydraulic oil to the arm cylinder as the spool moves. The oil path is connected to the direction control valve. A pilot oil for moving the spool flows through the oil path. The proportional solenoid valve for arm excavation is provided in the oil path. The arm control member serves for an operator to operate drive of the arm. The determination portion determines whether a first operation state in which an amount of operation of the arm control member is equal to or smaller than a prescribed value or a second operation state in which the amount of operation of the arm control member is greater than the prescribed value is established. The setting portion sets a command current instructing an opening of the proportional solenoid valve for arm excavation. The setting portion sets the command current to a constant value in the first operation state.

According to the work vehicle in the present invention, a constant command current is output to the proportional solenoid valve for arm excavation so as to set an opening of the proportional solenoid valve for arm excavation to be constant. Thus, a behavior of the arm can be stabilized. Thus, a cutting edge of the bucket can be stabilized and hence hunting can be suppressed.

Preferably, the arm control member outputs a hydraulic pressure signal in accordance with an operation by the operator. The setting portion sets the command current such that the hydraulic pressure signal output from the arm control member is guided as it is to the direction control valve in the first operation state.

According to the above, excessive variation in hydraulic pressure supplied to the direction control valve caused by the proportional solenoid valve for arm excavation, which results in instability of the behavior of the arm, is prevented. Thus, an operation of the arm directly in accordance with an operation of the arm control lever by an operator can be performed. Therefore, a cutting edge of the bucket is stabilized and hunting can be suppressed.

Preferably, an opening of the proportional solenoid valve for arm excavation set by the setting portion in the first operation state is greater than a maximum value in the first operation state of the opening of the proportional solenoid valve for arm excavation set in accordance with the amount of operation of the arm control member.

According to the above, since an opening of the proportional solenoid valve for arm excavation is constant, excessive variation in hydraulic pressure supplied to the direction control valve caused by the proportional solenoid valve for arm excavation, which results in instability of the behavior of the arm, is prevented. Thus, an operation of the arm directly in accordance with an operation of the arm control lever by an operator can be performed. Therefore, a cutting edge of the bucket is stabilized and hunting can be suppressed.

A work vehicle according to one aspect of the present invention includes a work implement, an arm cylinder, a direction control valve, an oil path, a proportional solenoid valve for arm excavation, an arm control member, an estimated cylinder speed determination portion, a command current operation portion, an intervention control unit, and a setting portion. The work implement includes a boom, an arm, and a bucket. The arm cylinder drives the arm. The direction control valve has a movable spool. The direction control valve operates the arm cylinder by allowing supply of a hydraulic oil to the arm cylinder as the spool moves. The oil path is connected to the direction control valve. A pilot oil for moving the spool flows through the oil path. The proportional solenoid valve for arm excavation is provided in the oil path. The arm control member serves for an operator to operate drive of the arm. The estimated cylinder speed determination portion calculates an estimated speed of the arm cylinder based on a speed table showing correlation between an amount of movement of the spool in accordance with an amount of operation of the arm control member and a speed of the arm cylinder. The command current operation portion operates a command current set value instructing an opening of the proportional solenoid valve for arm excavation based on the estimated speed of the arm cylinder calculated by the estimated cylinder speed determination portion. The intervention control unit carries out intervention control in which the boom is forcibly raised and a position of a cutting edge of the bucket is restricted to above design topography in accordance with a relative position of the cutting edge with respect to the design topography which shows an aimed shape of a target of work by the work implement. While the intervention control is carried out, the setting portion outputs, when the command current set value is equal to or smaller than a prescribed value, the prescribed value to the proportional solenoid valve for arm excavation and outputs the command current set value to the proportional solenoid valve for arm excavation when the command current set value is greater than the prescribed value. The setting portion outputs the command current set value to the proportional solenoid valve for arm excavation while the intervention control is not carried out.

According to the work vehicle in the present invention, a low-cut filter for a command current set value is provided and a lower limit value for a current output to the proportional solenoid valve for arm excavation is provided, so that magnitude of increase and decrease in current output to the proportional solenoid valve for arm excavation can be made smaller. By suppressing variation in current output to the proportional solenoid valve for arm excavation so as to reduce an amount of change in opening of the proportional solenoid valve for arm excavation, variation in cylinder speed at the time of extension of the arm cylinder can be lessened. By stabilizing a behavior of the arm, a cutting edge of the bucket can be stabilized and therefore hunting can be suppressed.

Advantageous Effects of Invention

In connection with the work vehicle, hunting can be suppressed.

DESCRIPTION OF EMBODIMENTS

An embodiment of the present invention will be described hereinafter with reference to the drawings. The present invention is not limited thereto. Constituent features in each embodiment described below can be combined as appropriate. Some components may not be employed.

<Overall Structure of Work Vehicle>

Figure 1:
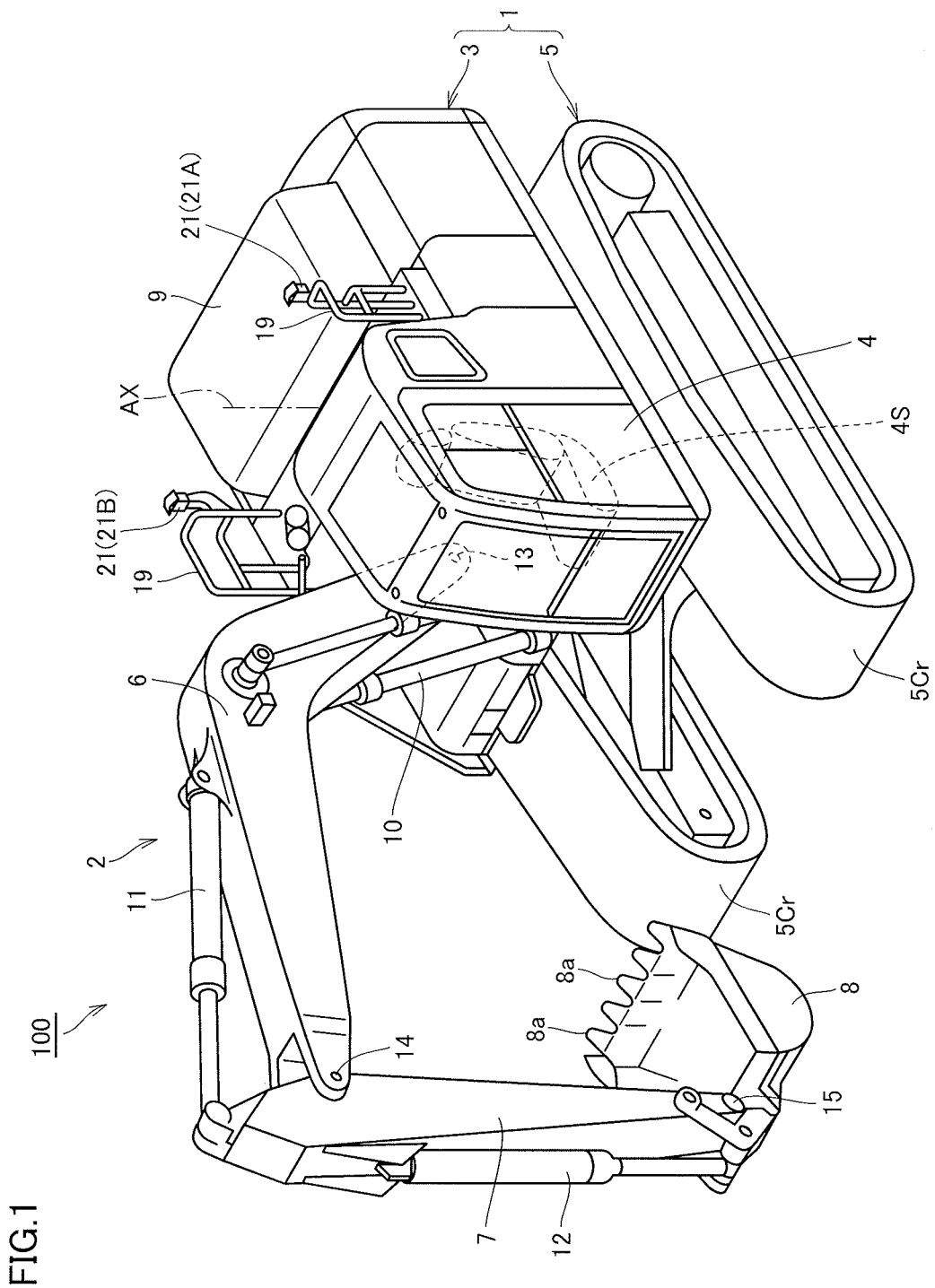
FIG. 1 is a diagram illustrating appearance of a work vehicle 100 based on an embodiment.

FIG. 1 is a diagram illustrating appearance of a work vehicle 100 based on an embodiment.

As shown in FIG. 1, in the present example, a hydraulic excavator will mainly be described by way of example as work vehicle 100.

Work vehicle 100 has a vehicular main body 1 and a work implement 2 operated with a hydraulic pressure. As will be described later, a control system 200 (FIG. 3) carrying out excavation control is mounted on work vehicle 100.

Vehicular main body 1 has a revolving unit 3 and a traveling apparatus 5. Traveling apparatus 5 has a pair of crawler belts 5Cr. Work vehicle 100 can travel as crawler belts 5Cr rotate. Traveling apparatus 5 may have wheels (tires).

Revolving unit 3 is arranged on traveling apparatus 5 and supported by traveling apparatus 5. Revolving unit 3 can revolve with respect to traveling apparatus 5, around an axis of revolution AX.

Revolving unit 3 has an operator's cab 4. This operator's cab 4 is provided with an operator's seat 4S where an operator sits. The operator can operate work vehicle 100 in operator's cab 4.

In the present example, positional relation among portions will be described with the operator seated at operator's seat 4S being defined as the reference. A fore/aft direction refers to a fore/aft direction of the operator who sits at operator's seat 4S. A lateral direction refers to a lateral direction of the operator who sits at operator's seat 4S. A direction in which the operator sitting at operator's seat 4S faces is defined as a fore direction and a direction opposed to the fore direction is defined as an aft direction. A right side and a left side at the time when the operator sitting at operator's seat 4S faces front are defined as a right direction and a left direction, respectively.

Revolving unit 3 has an engine compartment 9 accommodating an engine and a counterweight provided in a rear portion of revolving unit 3. In revolving unit 3, a handrail 19 is provided in front of engine compartment 9. In engine compartment 9, an engine and a hydraulic pump which are not shown are arranged.

Work implement 2 is supported by revolving unit 3. Work implement 2 has a boom 6, an arm 7, a bucket 8, a boom cylinder 10, an arm cylinder 11, and a bucket cylinder 12. Boom 6 is connected to revolving unit 3. Arm 7 is connected to boom 6. Bucket 8 is connected to arm 7.

Boom cylinder 10 drives boom 6. Arm cylinder 11 drives arm 7. Bucket cylinder 12 drives bucket 8. Each of boom cylinder 10, arm cylinder 11, and bucket cylinder 12 is implemented by a hydraulic cylinder driven with a hydraulic oil.

A base end portion of boom 6 is connected to revolving unit 3 with a boom pin 13 being interposed. A base end portion of arm 7 is connected to a tip end portion of boom 6 with an arm pin 14 being interposed. Bucket 8 is connected to a tip end portion of arm 7 with a bucket pin 15 being interposed.

Boom 6 can pivot around boom pin 13. Arm 7 can pivot around arm pin 14. Bucket 8 can pivot around bucket pin 15.

Each of arm 7 and bucket 8 is a movable member movable on a tip end side of boom 6.

Figure 2:
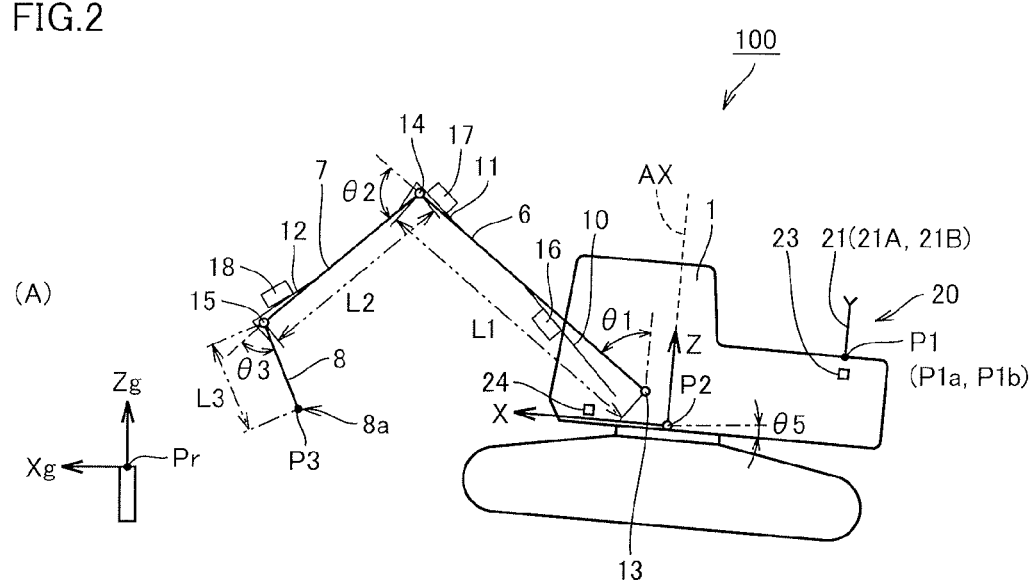
FIG. 2 is a diagram schematically illustrating work vehicle 100 based on the embodiment.
Figure 2:
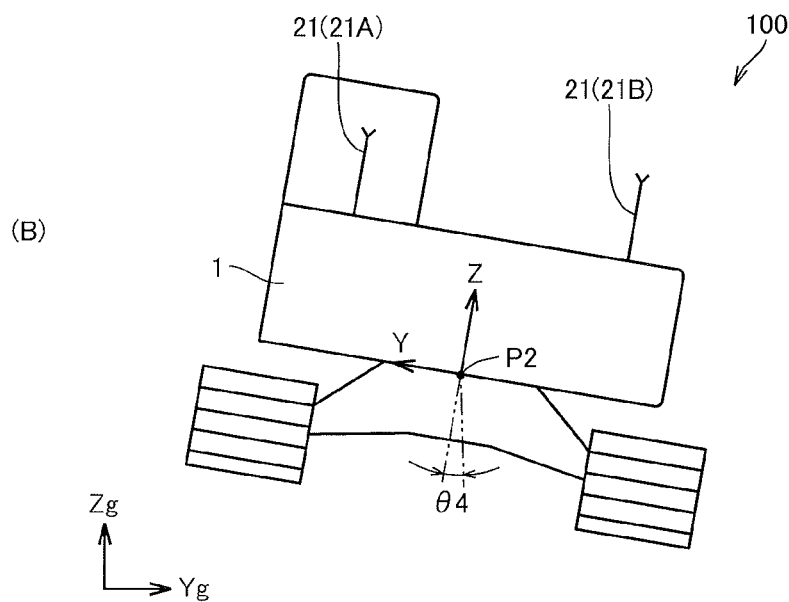

FIGS. 2 (A) and 2 (B) are diagrams schematically illustrating work vehicle 100 based on the embodiment. FIG. 2 (A) shows a side view of work vehicle 100. FIG. 2 (B) shows a rear view of work vehicle 100.

As shown in FIGS. 2 (A) and 2 (B), a length L1 of boom 6 refers to a distance between boom pin 13 and arm pin 14. A length L2 of arm 7 refers to a distance between arm pin 14 and bucket pin 15. A length L3 of bucket 8 refers to a distance between bucket pin 15 and a cutting edge 8a of bucket 8. Bucket 8 has a plurality of blades and a tip end portion of bucket 8 is called cutting edge 8a in the present example.

Bucket 8 does not have to have a blade. The tip end portion of bucket 8 may be formed from a steel plate having a straight shape.

Work vehicle 100 has a boom cylinder stroke sensor 16, an arm cylinder stroke sensor 17, and a bucket cylinder stroke sensor 18. Boom cylinder stroke sensor 16 is arranged in boom cylinder 10. Arm cylinder stroke sensor 17 is arranged in arm cylinder 11. Bucket cylinder stroke sensor 18 is arranged in bucket cylinder 12. Boom cylinder stroke sensor 16, arm cylinder stroke sensor 17, and bucket cylinder stroke sensor 18 are also collectively referred to as a cylinder stroke sensor.

A stroke length of boom cylinder 10 is found based on a result of detection by boom cylinder stroke sensor 16. A stroke length of arm cylinder 11 is found based on a result of detection by arm cylinder stroke sensor 17. A stroke length of bucket cylinder 12 is found based on a result of detection by bucket cylinder stroke sensor 18.

In the present example, stroke lengths of boom cylinder 10, arm cylinder 11, and bucket cylinder 12 are also referred to as a boom cylinder length, an arm cylinder length, and a bucket cylinder length, respectively. In the present example, a boom cylinder length, an arm cylinder length, and a bucket cylinder length are also collectively referred to as cylinder length data L. A scheme for detecting a stroke length with the use of an angle sensor can also be adopted.

Work vehicle 100 includes a position detection apparatus 20 which can detect a position of work vehicle 100.

Position detection apparatus 20 has an antenna 21, a global coordinate operation portion 23, and an inertial measurement unit (IMU) 24.

Antenna 21 is, for example, an antenna for global navigation satellite systems (GNSS). Antenna 21 is, for example, an antenna for real time kinematic-global navigation satellite systems (RTK-GNSS).

Antenna 21 is provided in revolving unit 3. In the present example, antenna 21 is provided in handrail 19 of revolving unit 3. Antenna 21 may be provided in the rear of engine compartment 9. For example, antenna 21 may be provided in the counterweight of revolving unit 3. Antenna 21 outputs a signal in accordance with a received radio wave (a GNSS radio wave) to global coordinate operation portion 23.

Global coordinate operation portion 23 detects an installation position P1 of antenna 21 in a global coordinate system. The global coordinate system is a three-dimensional coordinate system (Xg, Yg, Zg) based on a reference position Pr installed in an area of working. In the present example, reference position Pr is a position of a tip end of a reference marker set in the area of working. A local coordinate system is a three-dimensional coordinate system expressed by (X, Y, Z) with work vehicle 100 being defined as the reference. A reference position in the local coordinate system is data representing a reference position P2 located at axis of revolution (center of revolution) AX of revolving unit 3.

In the present example, antenna 21 has a first antenna 21A and a second antenna 21B provided in revolving unit 3 as being distant from each other in a direction of a width of the vehicle.

Global coordinate operation portion 23 detects an installation position P1a of first antenna 21A and an installation position P1b of second antenna 21B. Global coordinate operation portion 23 obtains reference position data P expressed by a global coordinate. In the present example, reference position data P is data representing reference position P2 located at axis of revolution (center of revolution) AX of revolving unit 3. Reference position data P may be data representing installation position P1.

In the present example, global coordinate operation portion 23 generates revolving unit orientation data Q based on two installation positions P1a and P1b. Revolving unit orientation data Q is determined based on an angle formed by a straight line determined by installation position P1a and installation position P1b with respect to a reference azimuth (for example, north) of the global coordinate. Revolving unit orientation data Q represents an orientation in which revolving unit 3 (work implement 2) is oriented. Global coordinate operation portion 23 outputs reference position data P and revolving unit orientation data Q to a display controller 28 which will be described later.

IMU 24 is provided in revolving unit 3. In the present example, IMU 24 is arranged in a lower portion of operator's cab 4. In revolving unit 3, a highly rigid frame is arranged in the lower portion of operator's cab 4. IMU 24 is arranged on that frame. IMU 24 may be arranged lateral to (on the right or left of) axis of revolution AX (reference position P2) of revolving unit 3. IMU 24 detects an angle of inclination θ4 representing inclination in the lateral direction of vehicular main body 1 and an angle of inclination θ5 representing inclination in the fore/aft direction of vehicular main body 1.

<Configuration of Control System>

Overview of control system 200 based on the embodiment will now be described.

Figure 3:
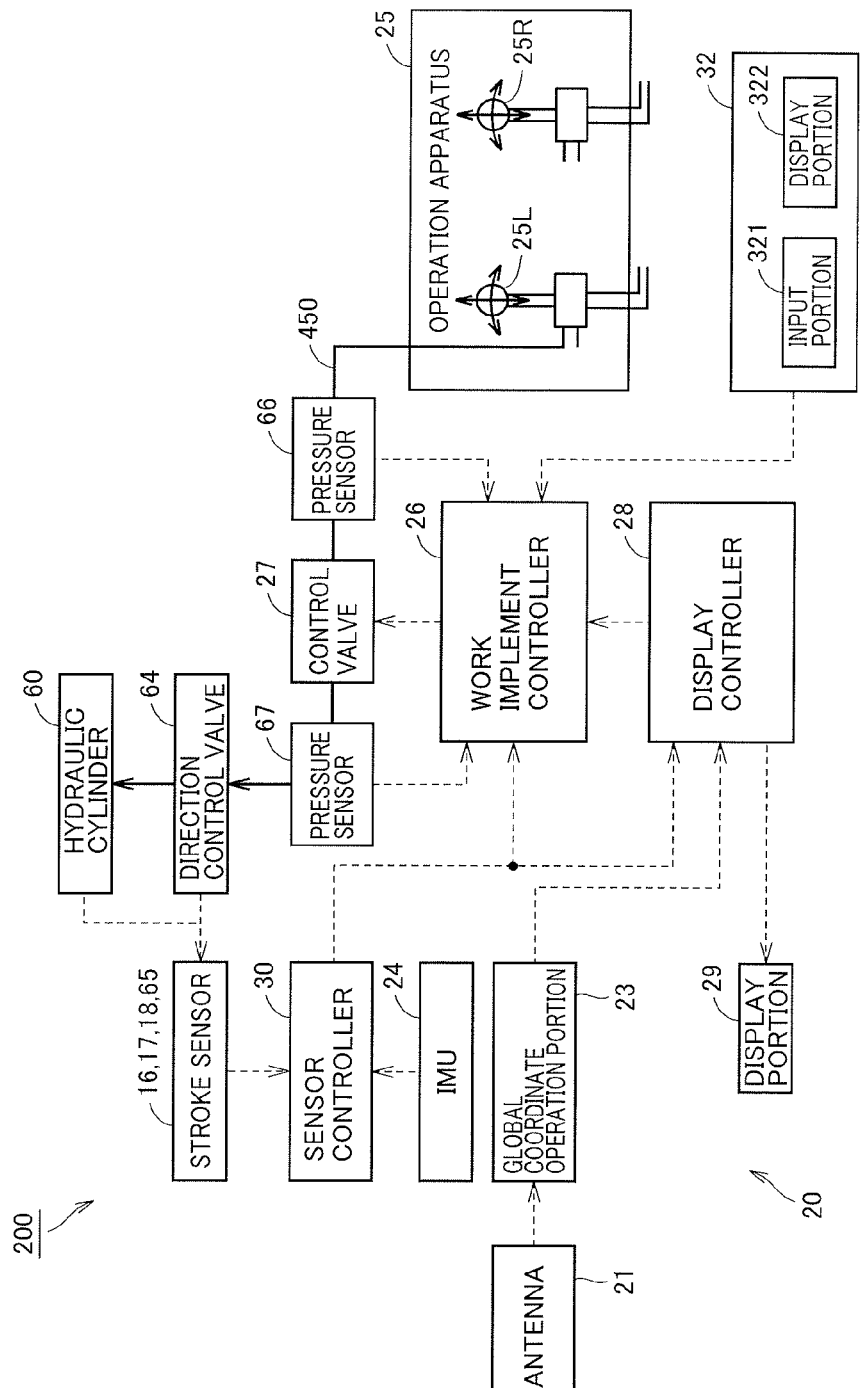
FIG. 3 is a functional block diagram showing a configuration of a control system 200 based on the embodiment.

FIG. 3 is a functional block diagram showing a configuration of control system 200 based on the embodiment.

As shown in FIG. 3, control system 200 controls processing for excavation with work implement 2. In the present example, control for excavation processing has profile control.

Profile control means automatic control of profile work in which soil abutting to a cutting edge of a bucket is plowed and leveled by moving the cutting edge of the bucket along design topography and a surface corresponding to flat design topography is made, and it is also referred to as excavation limit control.

Profile control is carried out when the arm is operated by an operator and a distance between the cutting edge of the bucket and design topography and a speed of the cutting edge are within the reference. During profile control, normally, the operator operates the arm while he/she always operates the boom in a direction in which the boom is lowered.

Control system 200 has boom cylinder stroke sensor 16, arm cylinder stroke sensor 17, bucket cylinder stroke sensor 18, antenna 21, global coordinate operation portion 23, IMU 24, an operation apparatus 25, a work implement controller 26, a pressure sensor 66 and a pressure sensor 67, a control valve 27, a direction control valve 64, display controller 28, a display portion 29, a sensor controller 30, and a man-machine interface portion 32.

Operation apparatus 25 is arranged in operator's cab 4. The operator operates operation apparatus 25. Operation apparatus 25 accepts an operation by the operator for driving work implement 2. In the present example, operation apparatus 25 is an operation apparatus of a pilot hydraulic type.

Direction control valve 64 regulates an amount of supply of a hydraulic oil to a hydraulic cylinder. Direction control valve 64 operates with an oil supplied to a first pressure reception chamber and a second pressure reception chamber. In the present example, an oil supplied to the hydraulic cylinder (boom cylinder 10, arm cylinder 11, and bucket cylinder 12) in order to operate the hydraulic cylinder is also referred to as a hydraulic oil. An oil supplied to direction control valve 64 for operating direction control valve 64 is also referred to as a pilot oil. A pressure of the pilot oil is also referred to as a pilot oil pressure.

The hydraulic oil and the pilot oil may be delivered from the same hydraulic pump. For example, a pressure of some of the hydraulic oil delivered from the hydraulic pump may be reduced by a pressure reduction valve and the hydraulic oil of which pressure has been reduced may be used as the pilot oil. A hydraulic pump delivering a hydraulic oil (a main hydraulic pump) and a hydraulic pump delivering a pilot oil (a pilot hydraulic pump) may be different from each other.

Operation apparatus 25 has a first control lever 25R and a second control lever 25L. First control lever 25R is arranged, for example, on the right side of operator's seat 4S. Second control lever 25L is arranged, for example, on the left side of operator's seat 4S. Operations of first control lever 25R and second control lever 25L in fore, aft, left, and right directions correspond to operations along two axes.

Boom 6 and bucket 8 are operated with the use of first control lever 25R.

An operation of first control lever 25R in the fore/aft direction corresponds to the operation of boom 6, and an operation for lowering boom 6 and an operation for raising boom 6 are performed in response to the operation in the fore/aft direction. A detected pressure generated in pressure sensor 66 at the time when a lever is operated in order to operate boom 6 and when a pilot oil is supplied to a pilot oil path 450 is denoted as MB.

An operation of first control lever 25R in the lateral direction corresponds to the operation of bucket 8, and an excavation operation and a dumping operation by bucket 8 are performed in response to an operation in the lateral direction. A detected pressure generated in pressure sensor 66 at the time when a lever is operated in order to operate bucket 8 and when a pilot oil is supplied to pilot oil path 450 is denoted as MT.

Arm 7 and revolving unit 3 are operated with the use of second control lever 25L.

An operation of second control lever 25L in the fore/aft direction corresponds to revolution of revolving unit 3, and an operation for revolving revolving unit 3 to the right and an operation for revolving revolving unit 3 to the left are performed in response to the operation in the fore/aft direction.

An operation of second control lever 25L in the lateral direction corresponds to the operation of arm 7, and an operation for raising arm 7 and an operation for lowering arm 7 are performed in response to the operation in the lateral direction. A detected pressure generated in pressure sensor 66 at the time when a lever is operated in order to operate arm 7 and when a pilot oil is supplied to pilot oil path 450 is denoted as MA.

In the present example, operations for raising and lowering boom 6 are also referred to as a raising operation and a lowering operation, respectively. An operation of arm 7 in a vertical direction is also referred to as a dumping operation and an excavation operation. An operation of bucket 8 in the vertical direction is also referred to as a dumping operation and an excavation operation.

A pilot oil delivered from the main hydraulic pump, of which pressure has been reduced by the pressure reduction valve, is supplied to operation apparatus 25. The pilot oil pressure is regulated based on an amount of operation of operation apparatus 25.

Pressure sensor 66 and pressure sensor 67 are arranged in pilot oil path 450. Pressure sensor 66 and pressure sensor 67 detect a pilot oil pressure. A result of detection by pressure sensor 66 and pressure sensor 67 is output to work implement controller 26.

First control lever 25R is operated in the fore/aft direction for driving boom 6. Direction control valve 64 regulates a direction of flow and a flow rate of the hydraulic oil supplied to boom cylinder 10 for driving boom 6, in accordance with an amount of operation of first control lever 25R (an amount of operation of the boom) in the fore/aft direction. First control lever 25R implements a boom control member accepting an operation by an operator for driving boom 6.

First control lever 25R is operated in the lateral direction for driving bucket 8. Direction control valve 64 regulates a direction of flow and a flow rate of the hydraulic oil supplied to bucket cylinder 12 for driving bucket 8, in accordance with an amount of operation of first control lever 25R (an amount of operation of the bucket) in the lateral direction. First control lever 25R implements a bucket control member accepting an operation by an operator for driving bucket 8.

Second control lever 25L is operated in the lateral direction for driving arm 7. Direction control valve 64 regulates a direction of flow and a flow rate of the hydraulic oil supplied to arm cylinder 11 for driving arm 7, in accordance with an amount of operation of second control lever 25L (an amount of operation of the arm) in the lateral direction. Second control lever 25L implements an arm control member accepting an operation by an operator for driving arm 7.

Second control lever 25L is operated in the fore/aft direction for driving revolving unit 3. Direction control valve 64 regulates a direction of flow and a flow rate of the hydraulic oil supplied to a hydraulic actuator for driving revolving unit 3, in accordance with an amount of operation of second control lever 25L in the fore/aft direction. Second control lever 25L implements a revolving unit control member accepting an operation by an operator for driving revolving unit 3.

The operation of first control lever 25R in the lateral direction may correspond to the operation of boom 6 and the operation thereof in the fore/aft direction may correspond to the operation of bucket 8. The lateral direction of second control lever 25L may correspond to the operation of revolving unit 3 and the operation in the fore/aft direction may correspond to the operation of arm 7.

Control valve 27 regulates an amount of supply of the hydraulic oil to the hydraulic cylinder (boom cylinder 10, arm cylinder 11, and bucket cylinder 12). Control valve 27 operates based on a control signal from work implement controller 26.

Man-machine interface portion 32 has an input portion 321 and a display portion (a monitor) 322.

In the present example, input portion 3211 has an operation button arranged around display portion 322. Input portion 321 may have a touch panel. Man-machine interface portion 32 is also referred to as a multi-monitor.

Display portion 322 displays an amount of remaining fuel and a coolant temperature as basic information.

Input portion 321 is operated by an operator. A command signal generated in response to an operation of input portion 321 is output to work implement controller 26.

Sensor controller 30 calculates a boom cylinder length based on a result of detection by boom cylinder stroke sensor 16. Boom cylinder stroke sensor 16 outputs pulses associated with a go-around operation to sensor controller 30. Sensor controller 30 calculates a boom cylinder length based on pulses output from boom cylinder stroke sensor 16.

Similarly, sensor controller 30 calculates an arm cylinder length based on a result of detection by arm cylinder stroke sensor 17. Sensor controller 30 calculates a bucket cylinder length based on a result of detection by bucket cylinder stroke sensor 18.

Sensor controller 30 calculates an angle of inclination $\theta 1$ of boom 6 with respect to a perpendicular direction of revolving unit 3 from the boom cylinder length obtained based on the result of detection by boom cylinder stroke sensor 16.

Sensor controller 30 calculates an angle of inclination $\theta 2$ of arm 7 with respect to boom 6 from the arm cylinder length obtained based on the result of detection by arm cylinder stroke sensor 17.

Sensor controller 30 calculates an angle of inclination $\theta 3$ of cutting edge 8a of bucket 8 with respect to arm 7 from the bucket cylinder length obtained based on the result of detection by bucket cylinder stroke sensor 18.

Positions of boom 6, arm 7, and bucket 8 of work vehicle 100 can be specified based on angles of inclination $\theta 1$, $\theta 2$, and $\theta 3$ which are results of calculation above, reference position data P, revolving unit orientation data Q, and cylinder length data L, and bucket position data representing a three-dimensional position of bucket 8 can be generated.

Angle of inclination $\theta 1$ of boom 6, angle of inclination $\theta 2$ of arm 7, and angle of inclination $\theta 3$ of bucket 8 do not have to be detected by the cylinder stroke sensor. An angle detector such as a rotary encoder may detect angle of inclination $\theta 1$ of boom 6. The angle detector detects angle of inclination $\theta 1$ by detecting an angle of bending of boom 6 with respect to revolving unit 3. Similarly, an angle detector attached to arm 7 may detect angle of inclination $\theta 2$ of arm 7. An angle detector attached to bucket 8 may detect angle of inclination $\theta 3$ of bucket 8.

<Configuration of Hydraulic Circuit>

Figure 4:
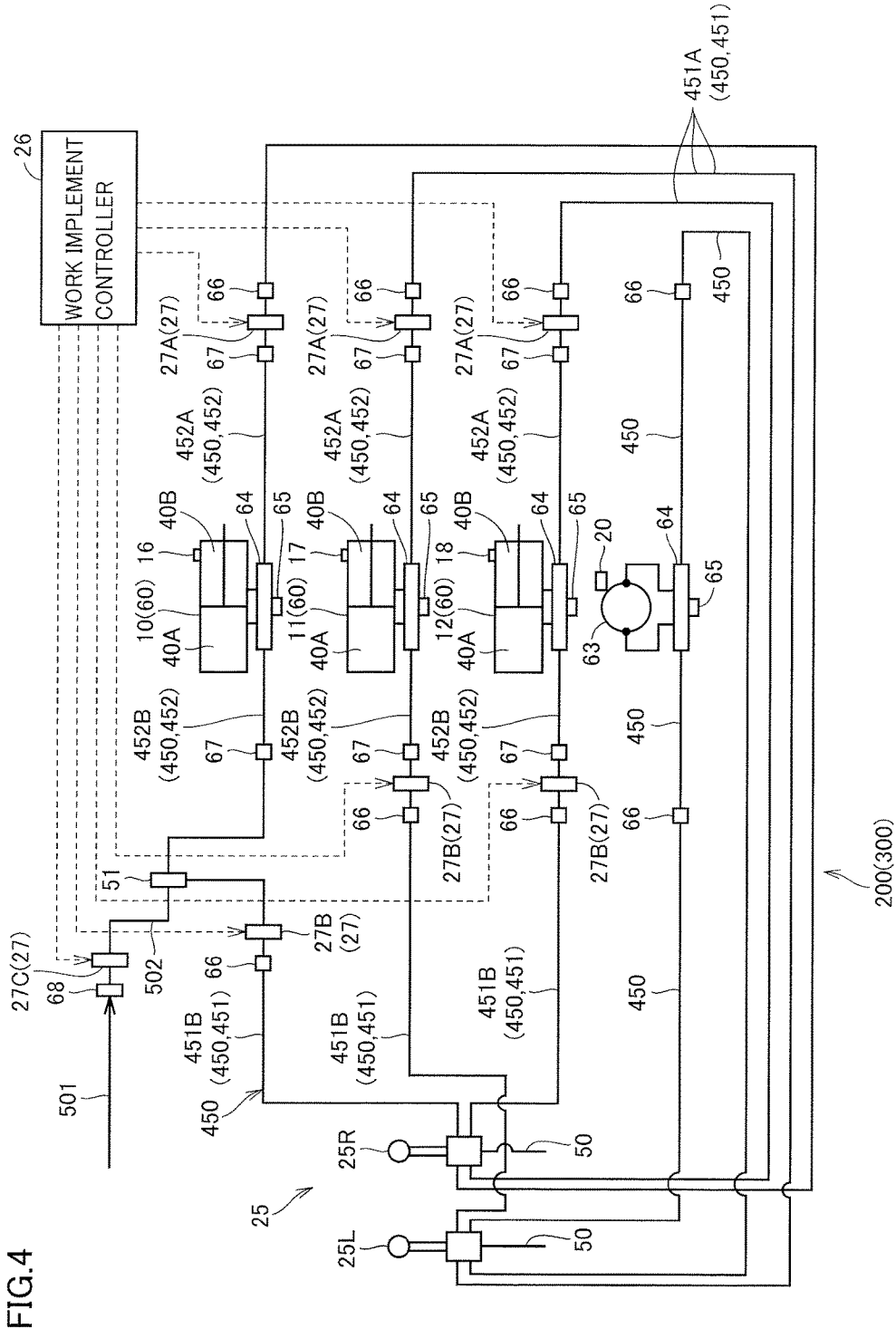
FIG. 4 is a diagram showing a configuration of a hydraulic system based on the embodiment.

FIG. 4 is a diagram showing a configuration of a hydraulic system based on the embodiment.

As shown in FIG. 4, a hydraulic system 300 includes boom cylinder 10, arm cylinder 11, and bucket cylinder 12 (a plurality of hydraulic cylinders 60) as well as a revolution motor 63 revolving revolving unit 3. Here, boom cylinder 10 is also denoted as hydraulic cylinder 10 (60), which is also applicable to other hydraulic cylinders.

Hydraulic cylinder 60 operates with a hydraulic oil supplied from a not-shown main hydraulic pump. Revolution motor 63 is a hydraulic motor and operates with the hydraulic oil supplied from the main hydraulic pump.

In the present example, direction control valve 64 controlling a direction of flow and a flow rate of the hydraulic oil is provided for each hydraulic cylinder 60. The hydraulic oil supplied from the main hydraulic pump is supplied to each hydraulic cylinder 60 through direction control valve 64. Direction control valve 64 is provided for revolution motor 63.

Each hydraulic cylinder 60 has a cap side (bottom side) oil chamber 40A and a rod side (head side) oil chamber 40B.

Direction control valve 64 is of a spool type in which a direction of flow of the hydraulic oil is switched by moving a rod-shaped spool. As the spool axially moves, switching between supply of the hydraulic oil to cap side oil chamber 40A and supply of the hydraulic oil to rod side oil chamber 40B is made. As the spool axially moves, an amount of supply of the hydraulic oil to hydraulic cylinder 60 (an amount of supply per unit time) is regulated. As an amount of supply of the hydraulic oil to hydraulic cylinder 60 is regulated, a cylinder speed is adjusted. By adjusting the cylinder speed, speeds of boom 6, arm 7, and bucket 8 are controlled. In the present example, direction control valve 64 functions as a regulator capable of regulating an amount of supply of the hydraulic oil to hydraulic cylinder 60 driving work implement 2 as the spool moves.

Each direction control valve 64 is provided with a spool stroke sensor 65 detecting a distance of movement of the spool (a spool stroke). A detection signal from spool stroke sensor 65 is output to sensor controller 30 (FIG. 3).

Drive of each direction control valve 64 is adjusted through operation apparatus 25. In the present example, operation apparatus 25 is an operation apparatus of a pilot hydraulic type.

The pilot oil delivered from the main hydraulic pump, of which pressure has been reduced by the pressure reduction valve, is supplied to operation apparatus 25.

Operation apparatus 25 has a pilot oil pressure regulation valve. The pilot oil pressure is regulated based on an amount of operation of operation apparatus 25. The pilot oil pressure drives direction control valve 64. As operation apparatus 25 regulates a pilot oil pressure, an amount of movement and a moving speed of the spool in the axial direction are adjusted. Operation apparatus 25 switches between supply of the hydraulic oil to cap side oil chamber 40A and supply of the hydraulic oil to rod side oil chamber 40B.

Operation apparatus 25 and each direction control valve 64 are connected to each other through pilot oil path 450. In the present example, control valve 27, pressure sensor 66, and pressure sensor 67 are arranged in pilot oil path 450.

Pressure sensor 66 and pressure sensor 67 detecting the pilot oil pressure are provided on opposing sides of each control valve 27, respectively. In the present example, pressure sensor 66 is arranged in an oil path 451 between operation apparatus 25 and control valve 27. Pressure sensor 67 is arranged in an oil path 452 between control valve 27 and direction control valve 64. Pressure sensor 66 detects a pilot oil pressure before regulation by control valve 27. Pressure sensor 67 detects a pilot oil pressure regulated by control valve 27. Results of detection by pressure sensor 66 and pressure sensor 67 are output to work implement controller 26.

Control valve 27 regulates a pilot oil pressure based on a control signal (an EPC current) from work implement controller 26. Control valve 27 is a proportional solenoid control valve and is controlled based on a control signal from work implement controller 26. Control valve 27 has a control valve 27B and a control valve 27A. Control valve 27B regulates a pilot oil pressure of the pilot oil supplied to the second pressure reception chamber of direction control valve 64, so as to be able to regulate an amount of supply of the hydraulic oil supplied to cap side oil chamber 40A through direction control valve 64. Control valve 27A regulates a pilot oil pressure of the pilot oil supplied to the first pressure reception chamber of direction control valve 64, so as to be able to regulate an amount of supply of the hydraulic oil supplied to rod side oil chamber 40B through direction control valve 64.

In the present example, pilot oil path 450 between operation apparatus 25 and control valve 27 of pilot oil path 450 is referred to as oil path (an upstream oil path) 451. Pilot oil path 450 between control valve 27 and direction control valve 64 is referred to as oil path (a downstream oil path) 452.

The pilot oil is supplied to each direction control valve 64 through oil path 452.

Oil path 452 has an oil path 452A connected to the first pressure reception chamber and an oil path 452B connected to the second pressure reception chamber.

When the pilot oil is supplied through oil path 452B to the second pressure reception chamber of direction control valve 64, the spool moves in accordance with the pilot oil pressure. The hydraulic oil is supplied to cap side oil chamber 40A through direction control valve 64. An amount of supply of the hydraulic oil to cap side oil chamber 40A is regulated based on an amount of movement of the spool in accordance with the amount of operation of operation apparatus 25.

When the pilot oil is supplied through oil path 452A to the first pressure reception chamber of direction control valve 64, the spool moves in accordance with the pilot oil pressure. The hydraulic oil is supplied to rod side oil chamber 40B through direction control valve 64. An amount of supply of the hydraulic oil to rod side oil chamber 40B is regulated based on an amount of movement of the spool in accordance with the amount of operation of operation apparatus 25.

Therefore, as the pilot oil of which pressure is regulated through operation apparatus 25 and control valve 27 is supplied to direction control valve 64, a position of the spool in the axial direction is adjusted.

Oil path 451 has an oil path 451A connecting oil path 452A and operation apparatus 25 to each other and an oil path 451B connecting oil path 452B and operation apparatus 25 to each other.

[As to Operation of Operation Apparatus 25 and Operation of Hydraulic System]

As described above, as operation apparatus 25 is operated, boom 6 performs two types of operations of a lowering operation and a raising operation.

As operation apparatus 25 is operated to perform the operation for raising boom 6, the pilot oil is supplied through oil path 451B and oil path 452B to direction control valve 64 connected to boom cylinder 10.

Thus, the hydraulic oil from the main hydraulic pump is supplied to boom cylinder 10 and the operation for raising boom 6 is performed.

As operation apparatus 25 is operated to perform the operation for lowering boom 6, the pilot oil is supplied through oil path 451A and oil path 452A to direction control valve 64 connected to boom cylinder 10.

Thus, the hydraulic oil from the main hydraulic pump is supplied to boom cylinder 10 and the operation for lowering boom 6 is performed.

In the present example, as boom cylinder 10 extends, boom 6 performs the raising operation, and as boom cylinder 10 contracts, boom 6 performs the lowering operation. As the hydraulic oil is supplied to cap side oil chamber 40A of boom cylinder 10, boom cylinder 10 extends and boom 6 performs the raising operation. As the hydraulic oil is supplied to rod side oil chamber 40B of boom cylinder 10, boom cylinder 10 contracts and boom 6 performs the lowering operation.

As operation apparatus 25 is operated, arm 7 performs two types of operations of an excavation operation and a dumping operation.

As operation apparatus 25 is operated to perform the operation for excavation by arm 7, the pilot oil is supplied through oil path 451B and oil path 452B to direction control valve 64 connected to arm cylinder 11.

Thus, the hydraulic oil from the main hydraulic pump is supplied to arm cylinder 11 and the operation for excavation by arm 7 is performed.

As operation apparatus 25 is operated to perform the operation for dumping by arm 7, the pilot oil is supplied through oil path 451A and oil path 452A to direction control valve 64 connected to arm cylinder 11.

Thus, the hydraulic oil from the main hydraulic pump is supplied to arm cylinder 11 and the operation for dumping by arm 7 is performed.

In the present example, as arm cylinder 11 extends, arm 7 performs the lowering operation (an excavation operation), and as arm cylinder 11 contracts, arm 7 performs the raising operation (a dumping operation). As the hydraulic oil is supplied to cap side oil chamber 40A of arm cylinder 11, arm cylinder 11 extends and arm 7 performs the lowering operation. As the hydraulic oil is supplied to rod side oil chamber 40B of arm cylinder 11, arm cylinder 11 contracts and arm 7 performs the raising operation.

As operation apparatus 25 is operated, bucket 8 performs two types of operations of an excavation operation and a dumping operation.

As operation apparatus 25 is operated to perform the operation for excavation by bucket 8, the pilot oil is supplied through oil path 451B and oil path 452B to direction control valve 64 connected to bucket cylinder 12.

Thus, the hydraulic oil from the main hydraulic pump is supplied to bucket cylinder 12 and the operation for excavation by bucket 8 is performed.

As operation apparatus 25 is operated to perform the operation for dumping by bucket 8, the pilot oil is supplied through oil path 451A and oil path 452A to direction control valve 64 connected to bucket cylinder 12.

Thus, the hydraulic oil from the main hydraulic pump is supplied to bucket cylinder 12 and the operation for dumping by bucket 8 is performed.

In the present example, as bucket cylinder 12 extends, bucket 8 performs the lowering operation (an excavation operation), and as bucket cylinder 12 contracts, bucket 8 performs the raising operation (a dumping operation). As the hydraulic oil is supplied to cap side oil chamber 40A of bucket cylinder 12, bucket cylinder 12 extends and bucket 8 performs the lowering operation. As the hydraulic oil is supplied to rod side oil chamber 40B of bucket cylinder 12, bucket cylinder 12 contracts and bucket 8 performs the raising operation.

As operation apparatus 25 is operated, revolving unit 3 performs two types of operations of an operation for revolving to the right and an operation for revolving to the left.

As operation apparatus 25 is operated to perform the operation for revolving unit 3 to revolve to the right, the hydraulic oil is supplied to revolution motor 63. As operation apparatus 25 is operated to perform the operation for revolving unit 3 to revolve to the left, the hydraulic oil is supplied to revolution motor 63.

[As to Normal Control and Profile Control (Excavation Limit Control) and Operation of Hydraulic System]

Normal control in which no profile control (excavation limit control) is carried out will be described.

In the case of normal control, work implement 2 operates in accordance with an amount of operation of operation apparatus 25.

Specifically, work implement controller 26 causes control valve 27 to open. By opening control valve 27, the pilot oil pressure of oil path 451 and the pilot oil pressure of oil path 452 are equal to each other. While control valve 27 is open, the pilot oil pressure (a PPC pressure) is regulated based on the amount of operation of operation apparatus 25. Thus, direction control valve 64 is regulated, and the operation for raising and lowering boom 6, arm 7, and bucket 8 described above can be performed.

On the other hand, profile control (excavation limit control) will be described.

In the case of profile control (excavation limit control), work implement 2 is controlled by work implement controller 26 based on an operation of operation apparatus 25.

Specifically, work implement controller 26 outputs a control signal to control valve 27. Oil path 451 has a prescribed pressure, for example, owing to an action of a pilot oil pressure regulation valve.

Control valve 27 operates based on a control signal from work implement controller 26. The hydraulic oil in oil path 451 is supplied to oil path 452 through control valve 27. Therefore, a pressure of the hydraulic oil in oil path 452 can be regulated (reduced) by means of control valve 27.

A pressure of the hydraulic oil in oil path 452 is applied to direction control valve 64. Thus, direction control valve 64 operates based on the pilot oil pressure controlled by control valve 27.

For example, work implement controller 26 can regulate a pilot oil pressure applied to direction control valve 64 connected to arm cylinder 11 by outputting a control signal to at least one of control valve 27A and control valve 27B. As the pilot oil of which pressure is regulated by control valve 27A is supplied to direction control valve 64, the spool axially moves toward one side. As the pilot oil of which pressure is regulated by control valve 27B is supplied to direction control valve 64, the spool axially moves toward the other side. Thus, a position of the spool in the axial direction is adjusted.

Control valve 27B regulating a pressure of a pilot oil supplied to direction control valve 64 connected to arm cylinder 11 implements a proportional solenoid valve for arm excavation.

Similarly, work implement controller 26 can regulate a pilot oil pressure applied to direction control valve 64 connected to bucket cylinder 12 by outputting a control signal to at least one of control valve 27A and control valve 27B.

Similarly, work implement controller 26 can regulate a pilot oil pressure applied to direction control valve 64 connected to boom cylinder 10 by outputting a control signal to at least one of control valve 27A and control valve 27B.

Furthermore, work implement controller 26 can regulate a pilot oil pressure applied to direction control valve 64 connected to boom cylinder 10 by outputting a control signal to a control valve 27C.

Figure 6:
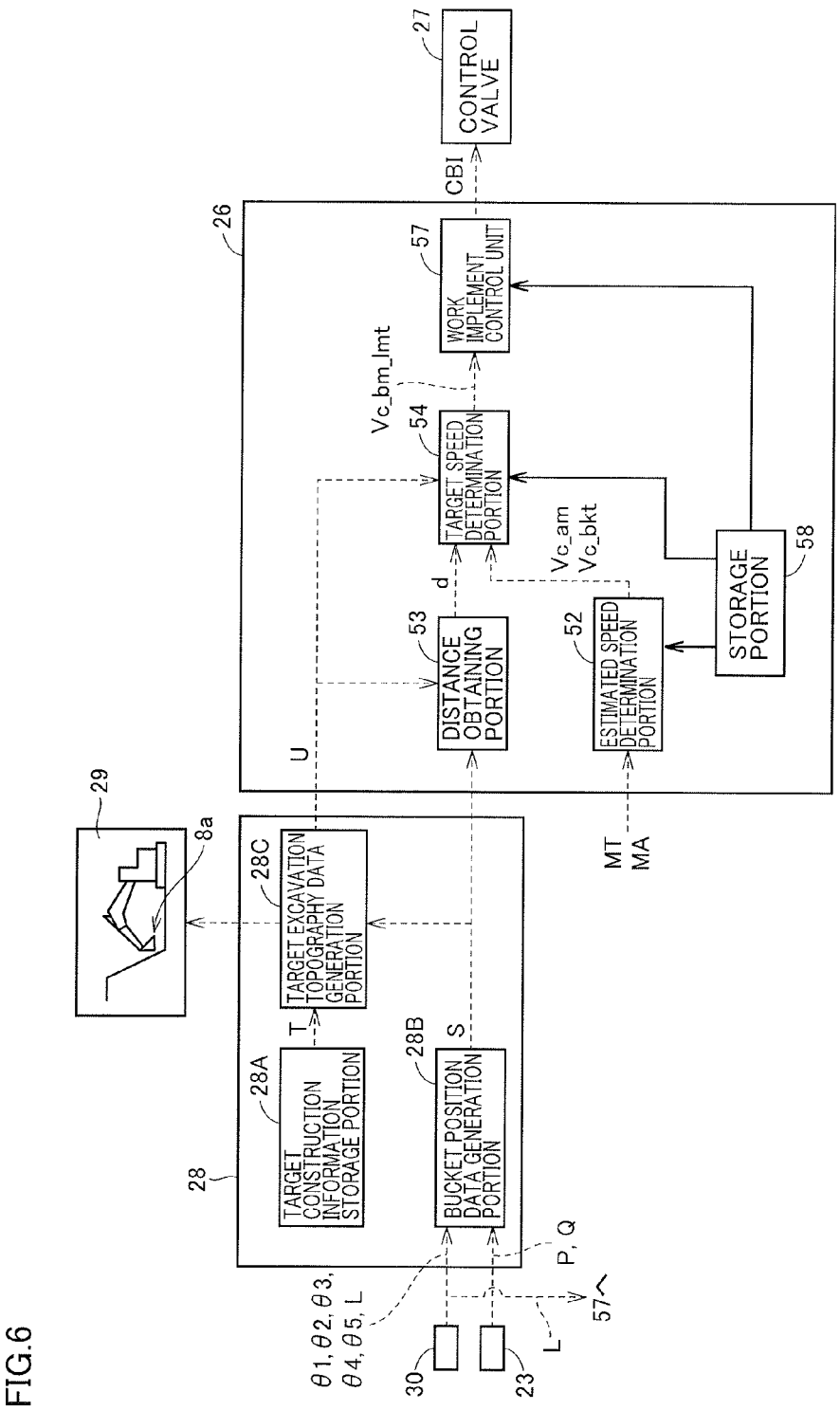
FIG. 6 is a functional block diagram showing the configuration of control system 200 carrying out profile control based on the embodiment.

Thus, work implement controller 26 controls movement of boom 6 (intervention control) such that cutting edge 8a of bucket 8 does not enter target excavation topography U (FIG. 6).

In the present example, control of a position of boom 6 by outputting a control signal to control valve 27 connected to boom cylinder 10 such that entry of cutting edge 8a into target excavation topography U is suppressed is referred to as intervention control.

Specifically, work implement controller 26 controls a speed of boom 6 such that a speed at which bucket 8 comes closer to target excavation topography U decreases in accordance with distance d (FIGS. 6 and 7) between target excavation topography U and bucket 8, based on target excavation topography U representing design topography which is an aimed shape of an excavation target and bucket position data S (FIG. 6) representing a position of cutting edge 8a of bucket 8.

Hydraulic system 300 has oil paths 501 and 502, control valve 27C, a shuttle valve 51, and a pressure sensor 68, as a mechanism for intervention control of the operation for raising boom 6.

Oil paths 501 and 502 are connected to control valve 27C and supply a pilot oil to be supplied to direction control valve 64 connected to boom cylinder 10.

The pilot oil before passage through control valve 27C flows through oil path 501. The pilot oil after passage through control valve 27C flows through oil path 502. Oil path 502 is connected to control valve 27C and shuttle valve 51, and connected through shuttle valve 51 to oil path 452B connected to direction control valve 64.

Pressure sensor 68 detects a pilot oil pressure of the pilot oil in oil path 501.

Control valve 27C is controlled based on a control signal output from work implement controller 26 for carrying out intervention control.

Shuttle valve 51 has two inlet ports and one outlet port. One inlet port is connected to oil path 502. The other inlet port is connected to control valve 27B through oil path 452B. The outlet port is connected to direction control valve 64 through oil path 452B. Shuttle valve 51 connects oil path 452B connected to direction control valve 64 to an oil path higher in pilot oil pressure, of oil path 502 and oil path 452B connected to control valve 27B.

Shuttle valve 51 is a high pressure priority shuttle valve. Shuttle valve 51 selects a pressure on a high pressure side, based on comparison between the pilot oil pressure of oil path 502 connected to one of the inlet ports and the pilot oil pressure of oil path 452B on the side of control valve 27B connected to the other of the inlet ports. Shuttle valve 51 communicates a flow path on the high pressure side, of oil path 502 and oil path 452B on the side of control valve 27B to the outlet port, and allows supply of the pilot oil which flows through the flow path on the high pressure side to direction control valve 64.

In the present example, work implement controller 26 outputs a control signal so as to fully open control valve 27B and close oil path 501 by means of control valve 27C, such that direction control valve 64 is driven based on the pilot oil pressure regulated in response to the operation of operation apparatus 25 while intervention control is not carried out.

Alternatively, work implement controller 26 outputs a control signal to each control valve 27 such that direction control valve 64 is driven based on the pilot oil pressure regulated by control valve 27 while intervention control is carried out.

When intervention control restricting movement of boom 6 is carried out, work implement controller 26 controls control valve 27C, for example, such that the pilot oil pressure regulated by control valve 27C is higher than the pilot oil pressure regulated through operation apparatus 25. Thus, the pilot oil from control valve 27C is supplied to direction control valve 64 through shuttle valve 51.

<Profile Control>

Figure 5:
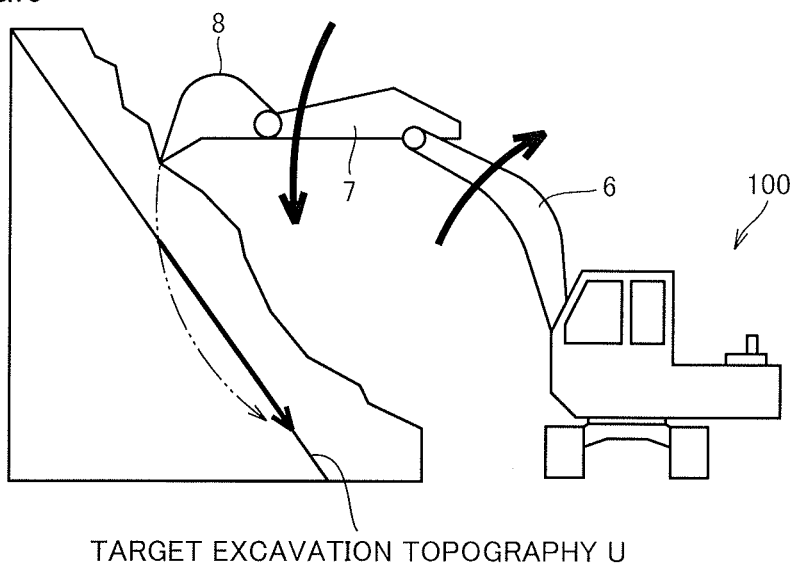
FIG. 5 is a diagram schematically showing an operation of a work implement 2 when profile control (excavation limit control) based on the embodiment is carried out.

FIG. 5 is a diagram schematically showing an operation of work implement 2 when profile control (excavation limit control) based on the embodiment is carried out.

As shown in FIG. 5, in profile control (excavation limit control), intervention control including the operation for raising boom 6 is carried out such that bucket 8 does not enter the design topography. Specifically, in the present example, in excavation by an excavation operation by arm 7 through operation apparatus 25, hydraulic system 300 carries out control such that arm 7 is lowered and boom 6 is raised.

FIG. 6 is a functional block diagram showing a configuration of control system 200 carrying out profile control based on the embodiment.

As shown in FIG. 6, a functional block of work implement controller 26 and display controller 28 in control system 200 is shown.

Here, intervention control of boom 6 mainly based on profile control (excavation limit control) will mainly be described. As described above, intervention control is control of movement of boom 6 such that cutting edge 8a of bucket 8 does not enter target excavation topography U.

Specifically, work implement controller 26 calculates distance d between target excavation topography U and bucket 8 based on target excavation topography U representing the design topography which is an aimed shape of an excavation target and bucket position data S representing a position of cutting edge 8a of bucket 8. Then, a control command CBI to control valve 27 based on intervention control of boom 6 is output such that a speed at which bucket 8 comes closer to target excavation topography U decreases in accordance with distance d.

Initially, work implement controller 26 calculates an estimated speed of cutting edge 8a of the bucket in the operation of boom 6, arm 7, and bucket 8 based on an operation command resulting from the operation of operation apparatus 25. Then, a boom target speed for controlling a speed of boom 6 is calculated based on the result of calculation, such that cutting edge 8a of bucket 8 does not enter target excavation topography U. Then, control command CBI to control valve 27 is output such that boom 6 operates at the boom target speed or lower.

The functional block will specifically be described below with reference to FIG. 6.

As shown in FIG. 6, display controller 28 has a target construction information storage portion 28A, a bucket position data generation portion 28B, and a target excavation topography data generation portion 28C.

Display controller 28 receives an input from sensor controller 30.

Sensor controller 30 obtains cylinder length data L and angles of inclination θ1, θ2, and θ3 from a result of detection by cylinder stroke sensors 16, 17, and 18. Sensor controller 30 obtains data on angle of inclination θ4 and data on angle of inclination θ5 output from IMU 24. Sensor controller 30 outputs to display controller 28, cylinder length data L, data on angles of inclination θ1, θ2, and θ3, as well as data on angle of inclination θ4 and data on angle of inclination θ5. Sensor controller 30 also outputs data of cylinder length data L to work implement controller 26.

As described above, in the present example, the result of detection by cylinder stroke sensors 16, 17, and 18 and the result of detection by IMU 24 are output to sensor controller 30 and sensor controller 30 performs prescribed operation processing.

In the present example, a function of sensor controller 30 may be performed by work implement controller 26 instead. For example, a result of detection by the cylinder stroke sensor (16, 17, and 18) may be output to work implement controller 26, and work implement controller 26 may calculate a cylinder length (a boom cylinder length, an arm cylinder length, and a bucket cylinder length) based on a result of detection by the cylinder stroke sensor (16, 17, and 18). A result of detection by IMU 24 may be output to work implement controller 26.

Global coordinate operation portion 23 obtains reference position data P and revolving unit orientation data. Q and outputs them to display controller 28.

Target construction information storage portion 28A stores target construction information (three-dimensional design topography data) T representing three-dimensional design topography which is an aimed shape of an area of working. Target construction information T has coordinate data and angle data necessary for generation of target excavation topography (design topography data) U representing the design topography which is an aimed shape of an excavation target. Target construction information T may be supplied to display controller 28, for example, through a radio communication apparatus.

Bucket position data generation portion 28B generates bucket position data S representing a three-dimensional position of bucket 8 based on angles of inclination θ1, θ2, θ3, θ4, and θ5, reference position data P, revolving unit orientation data Q, and cylinder length data L. Information on a position of cutting edge 8a may be transferred from a connection type recording device such as a memory.

In the present example, bucket position data S is data representing a three-dimensional position of cutting edge 8a.

Target excavation topography data generation portion 28C generates target excavation topography U representing an aimed shape of an excavation target, by using bucket position data S obtained from bucket position data generation portion 28B and target construction information T stored in target construction information storage portion 28A, which will be described later.

Target excavation topography data generation portion 28C outputs data on generated target excavation topography U to display portion 29. Thus, display portion 29 displays the target excavation topography.

Display portion 29 is implemented, for example, by a monitor, and displays various types of information on work vehicle 100. In the present example, display portion 29 has a human-machine interface (HMI) monitor as an operator guidance monitor.

Target excavation topography data generation portion 28C outputs data on target excavation topography U to work implement controller 26. Bucket position data generation portion 28B outputs generated bucket position data S to work implement controller 26.

Work implement controller 26 has an estimated speed determination portion 52, a distance obtaining portion 53, a target speed determination portion 54, a work implement control unit 57, and a storage portion 58.

Work implement controller 26 obtains an operation command (pressures MA and MT) from operation apparatus 25 as well as bucket position data S and target excavation topography U from display controller 28, and outputs control command CBI for control valve 27. Work implement controller 26 obtains various parameters necessary for operation processing from sensor controller 30 and global coordinate operation portion 23 as necessary.

Estimated speed determination portion 52 calculates an arm estimated speed Vc_am and a bucket estimated speed Vc_bkt corresponding to an operation of a lever of operation apparatus 25 for driving arm 7 and bucket 8.

Here, arm estimated speed Vc_am refers to a speed of cutting edge 8a of bucket 8 in a case that only arm cylinder 11 is driven. Bucket estimated speed Vc_bkt refers to a speed of cutting edge 8a of bucket 8 in a case that only bucket cylinder 12 is driven.

Estimated speed determination portion 52 calculates arm estimated speed Vc_am corresponding to an arm operation command (pressure MA). Similarly, estimated speed determination portion 52 calculates bucket estimated speed Vc_bkt corresponding to a bucket operation command (pressure MT). Thus, an estimated speed of cutting edge 8a of bucket 8 corresponding to each operation command for arm 7 and bucket 8 can be calculated.

Storage portion 58 stores data such as various tables for estimated speed determination portion 52, target speed determination portion 54, and work implement control unit 57 to perform operation processing.

Distance obtaining portion 53 obtains data on target excavation topography U from target excavation topography data generation portion 28C. Distance obtaining portion 53 calculates distance d in a direction perpendicular to target excavation topography U between cutting edge 8a of bucket 8 and target excavation topography U, based on target excavation topography U and bucket position data S representing a position of cutting edge 8a of bucket 8 obtained by bucket position data generation portion 28B.

Target speed determination portion 54 determines a target speed Vc_bm_lmt of boom 6 in accordance with a speed limit table. Specifically, target speed determination portion 54 calculates a speed limit of the cutting edge based on current distance d, by using the speed limit table showing relation between the speed limit of cutting edge 8a and distance d between target excavation topography U and bucket 8. Then, target speed Vc_bm_lmt of boom 6 is determined by calculating a difference between the speed limit of the cutting edge, and arm estimated speed Vc_am and bucket estimated speed Vc_bkt. The speed limit table is stored (saved) in advance in storage portion 58.

Work implement control unit 57 generates control command CBI to boom cylinder 10 in accordance with boom target speed Vc_bm_lmt and outputs the command to control valve 27 connected to boom cylinder 10. Thus, control valve 27 connected to boom cylinder 10 is controlled and intervention control of boom 6 based on profile control (excavation limit control) is carried out.

[Calculation of Distance d Between Cutting Edge 8a of Bucket 8 and Target Excavation Topography U]

Figure 7:
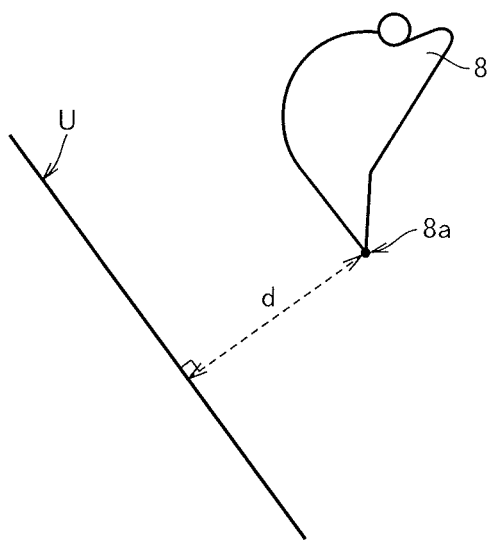
FIG. 7 is a diagram illustrating obtainment of a distance d between a cutting edge 8a of a bucket 8 and target design topography U based on the embodiment.

FIG. 7 is a diagram illustrating obtainment of distance d between cutting edge 8a of bucket 8 and target excavation topography U based on the embodiment.

As shown in FIG. 7, distance obtaining portion 53 calculates distance d shortest between cutting edge 8a of bucket 8 and a surface of target excavation topography U based on information on a position of cutting edge 8a (bucket position data S).

In the present example, profile control (excavation limit control) is carried out based on distance d shortest between cutting edge 8a of bucket 8 and the surface of target excavation topography U.

[Scheme for Calculating Estimated Speed]

Figure 8:
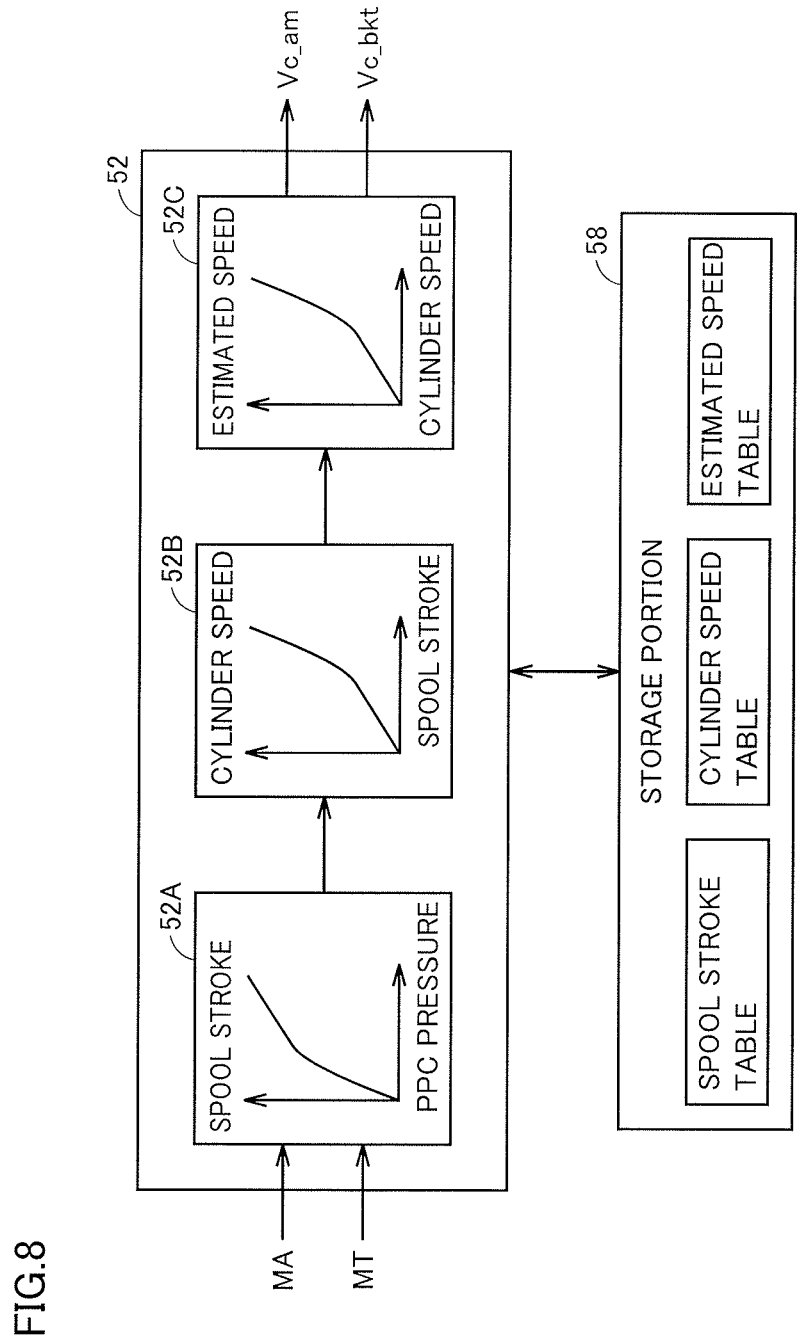
FIG. 8 is a functional block diagram illustrating operation processing in an estimated speed determination portion 52 based on the embodiment.

FIG. 8 is a functional block diagram illustrating operation processing in estimated speed determination portion 52 based on the embodiment.

In FIG. 8, estimated speed determination portion 52 calculates arm estimated speed Vc_am corresponding to an arm operation command (pressure MA) and bucket estimated speed Vc_bkt corresponding to a bucket operation command (pressure MT). As described above, arm estimated speed Vc_am refers to a speed of cutting edge 8a of bucket 8 in a case that only arm cylinder 11 is driven. Bucket estimated speed Vc_bkt refers to a speed of cutting edge 8a of bucket 8 in a case that only bucket cylinder 12 is driven.

Estimated speed determination portion 52 has a spool stroke operation portion 52A, a cylinder speed operation portion 52B, and an estimated speed operation portion 52C.

Spool stroke operation portion 52A calculates an amount of a spool stroke of spool 80 of hydraulic cylinder 60 based on a spool stroke table in accordance with an operation command (pressure) stored in storage portion 58. A pressure of a pilot oil for moving spool 80 is also referred to as a PPC pressure.

An amount of movement of spool 80 is adjusted by a pressure of oil path 452 (pilot oil pressure) controlled by operation apparatus 25 or by means of control valve 27. The pilot oil pressure of oil path 452 is a pressure of the pilot oil in oil path 452 for moving the spool and regulated by operation apparatus 25 or by means of control valve 27.

Therefore, an amount of movement of the spool and a PPC pressure correlate with each other.

Cylinder speed operation portion 52B calculates a cylinder speed of hydraulic cylinder 60 based on a cylinder speed table in accordance with the calculated amount of the spool stroke.

A cylinder speed of hydraulic cylinder 60 is adjusted based on an amount of supply of the hydraulic oil per unit time, which is supplied from the main hydraulic pump through direction control valve 64. Direction control valve 64 has movable spool 80. An amount of supply of the hydraulic oil per unit time to hydraulic cylinder 60 is adjusted based on an amount of movement of spool 80. Therefore, a cylinder speed and an amount of movement of the spool (a spool stroke) correlate with each other.

Estimated speed operation portion 52C calculates an estimated speed based on an estimated speed table in accordance with the calculated cylinder speed of hydraulic cylinder 60.

Since work implement 2 (boom 6, arm 7, and bucket 8) operates in accordance with a cylinder speed of hydraulic cylinder 60, a cylinder speed and an estimated speed correlate with each other.

Through the processing above, estimated speed determination portion 52 calculates arm estimated speed Vc_am corresponding to an arm operation command (pressure MA) and bucket estimated speed Vc_bkt corresponding to a bucket operation command (pressure MT). The spool stroke table, the cylinder speed table, and the estimated speed table are provided for boom 6, arm 7, and bucket 8, respectively, found based on experiments or simulations, and stored in advance in storage portion 58.

An estimated speed of cutting edge 8a of bucket 8 corresponding to each operation command can thus be calculated.

[Scheme for Calculating Boom Target Speed]

In calculating a boom target speed, speed components Vcy_am and Vcy_bkt in a direction perpendicular to the surface of target excavation topography U (perpendicular speed components), of estimated speeds Vc_am and Vc_bkt of arm. 7 and bucket 8 should be calculated, respectively. Therefore, initially, a scheme for calculating perpendicular speed components Vcy_am and Vcy_bkt will be described.

Figure 9:
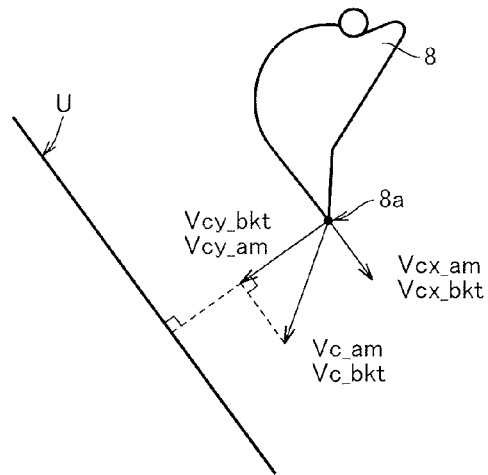
FIG. 9 is a diagram illustrating a scheme for calculating perpendicular speeds Vcy_am and Vcy_bkt based on the embodiment.
Figure 9:
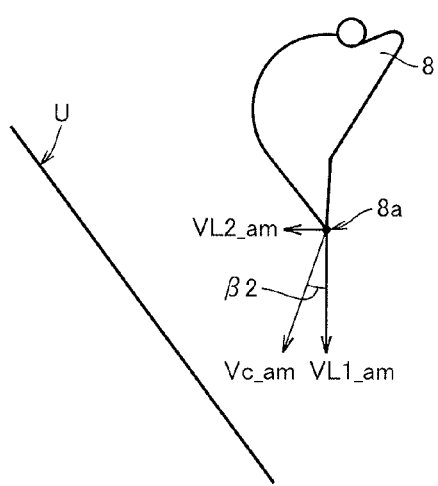
Figure 9:
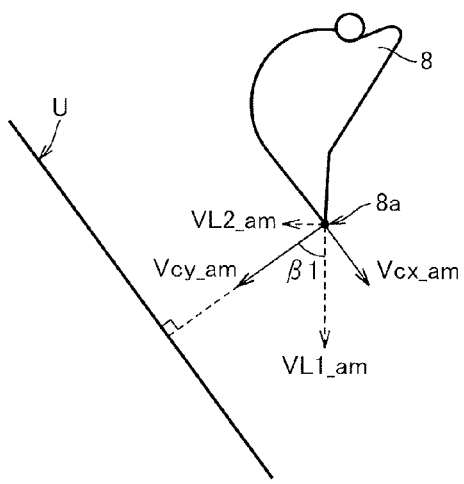

FIGS. 9 (A) to 9 (C) are diagrams illustrating a scheme for calculating perpendicular speed components Vcy_am and Vcy_bkt based on the present embodiment.

As shown in FIG. 9 (A), target speed determination portion 54 (FIG. 6) converts arm estimated speed Vc_am into a speed component Vcy_am in a direction perpendicular to the surface of target excavation topography U (a perpendicular speed component) and a speed component Vcx_am in a direction in parallel to the surface of target excavation topography U (a horizontal speed component).

Here, target speed determination portion 54 finds an inclination of a perpendicular axis (axis of revolution AX of revolving unit 3) of the local coordinate system with respect to a perpendicular axis of the global coordinate system and an inclination in a direction perpendicular to the surface of target excavation topography U with respect to the perpendicular axis of the global coordinate system, from an angle of inclination obtained from sensor controller 30 and target excavation topography U. Target speed determination portion 54 finds an angle β1 representing an inclination between the perpendicular axis of the local coordinate system and the direction perpendicular to the surface of target excavation topography U from these inclinations. This is also the case with bucket estimated speed Vc_bkt.

Then, as shown in FIG. 9 (B), target speed determination portion 54 converts arm estimated speed Vc_am into a speed component VL1_am in a direction of the perpendicular axis of the local coordinate system and a speed component VL2_am in a direction of a horizontal axis based on a trigonometric function, from an angle β2 formed between the perpendicular axis of the local coordinate system and the direction of arm estimated speed Vc_am.

Then, as shown in FIG. 9 (C), target speed determination portion 54 converts speed component VL1_am in the direction of the perpendicular axis of the local coordinate system and speed component VL2_am in the direction of the horizontal axis into perpendicular speed component Vcy_am and horizontal speed component Vcx_am with respect to target excavation topography U based on the trigonometric function, from inclination β1 between the perpendicular axis of the local coordinate system and the direction perpendicular to the surface of target excavation topography U. Similarly, target speed determination portion 54 converts bucket estimated speed Vc_bkt into perpendicular speed component Vcy_bkt in the direction of the perpendicular axis of the local coordinate system and a horizontal speed component Vcx_bkt.

Perpendicular speed components Vcy_am and Vcy_bkt are thus calculated.

Furthermore, since a speed limit for work implement 2 as a whole is necessary in calculating a boom target speed, a speed limit table for work implement 2 as a whole will now be described.

Figure 10:
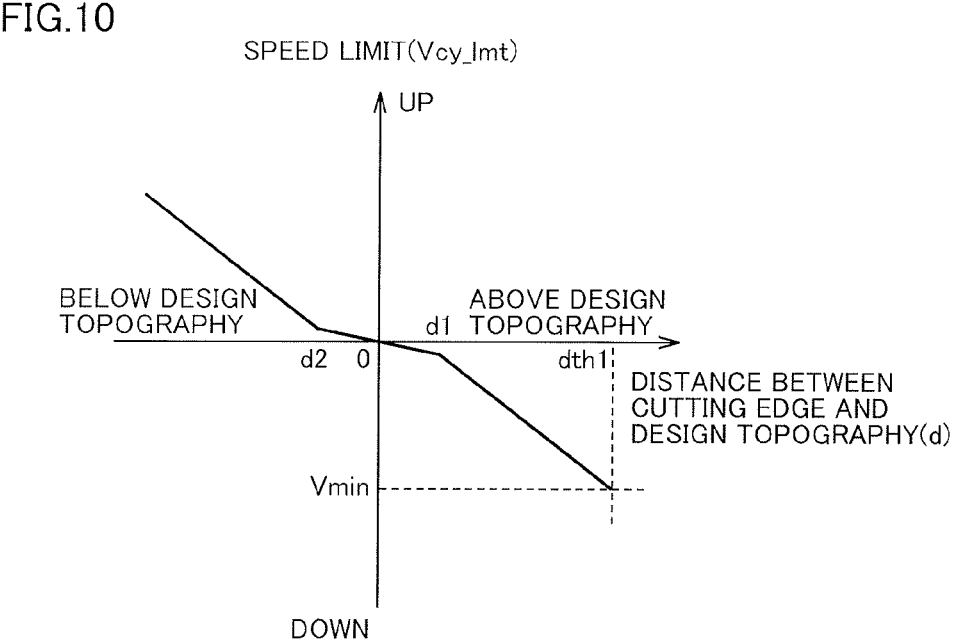
FIG. 10 is a diagram illustrating one example of a speed limit table for work implement 2 as a whole in profile control based on the embodiment.

FIG. 10 is a diagram illustrating one example of a speed limit table for work implement 2 as a whole in profile control based on the embodiment.

As shown in FIG. 10, here, the ordinate represents a speed limit Vcy_lmt and the abscissa represents distance d between the cutting edge and the design topography.

In the present example, distance d at the time when cutting edge 8a of bucket 8 is located on an outer side of the surface of target excavation topography U (outside of the excavation target relative to target excavation topography U) has a positive value, and distance d at the time when cutting edge 8a is located on an inner side of the surface of target excavation topography U (on an inner side of an excavation target relative to target excavation topography U) has a negative value. Distance d at the time when cutting edge 8a is located above the surface of target excavation topography U is positive, and distance d at the time when cutting edge 8a is located below the surface of target excavation topography U has a negative value.

Distance d at the time when cutting edge 8a is at a position where it does not invade target excavation topography U is positive and distance d at the time when cutting edge 8a is at a position where it invades target excavation topography U has a negative value.

Distance d at the time when cutting edge 8a is located on target excavation topography U (cutting edge 8a is in contact with target excavation topography U) is 0.

In the present example, a speed at the time when cutting edge 8a moves from the inside to the outside of target excavation topography U has a positive value, and a speed at the time when cutting edge 8a moves from the outside to the inside of target excavation topography U has a negative value. A speed at the time when cutting edge 8a moves to above target excavation topography U has a positive value, and a speed at the time when cutting edge 8a moves to below target excavation topography U has a negative value.

In the speed limit table, an inclination of speed limit Vcy_lmt in a case that distance d is between d1 and d2 is smaller than an inclination in a case that distance d is equal to or greater than d1 or equal to or smaller than d2. d1 is greater than 0. d2 is smaller than 0.

In order to set a speed limit more specifically in an operation around the surface of target excavation topography U, an inclination in a case that distance d is between d1 and d2 is made smaller than an inclination in a case that distance d is equal to or greater than d1 or equal to or smaller than d2.

When distance d is equal to or greater than d1, speed limit Vcy_lmt has a negative value, and an absolute value of speed limit Vcy_lmt increases with increase in absolute value of distance d.

When distance d is equal to or greater than d1, above target excavation topography U, a speed at which the cutting edge moves to below target excavation topography U is greater and an absolute value of speed limit Vcy_lmt is greater as cutting edge 8a is more distant from the surface of target excavation topography U.

When distance d is smaller than 0, speed limit Vcy_lmt has a positive value, and an absolute value of speed limit Vcy_lmt increases with increase in absolute value of distance d.

When distance d by which cutting edge 8a of bucket 8 is distant from target excavation topography U is smaller than 0, below target excavation topography U, a speed at which the cutting edge moves to above target excavation topography U is greater and an absolute value of speed limit Vcy_lmt is greater as cutting edge 8a is more distant from target excavation topography U.

When distance d is at a prescribed value dth1, speed limit Vcy_lmt is set to Vmin. Prescribed value dth1 is a positive value and greater than d1.

When distance d is equal to or greater than prescribed value dth1, intervention control of an operation of work implement 2 is not carried out. Therefore, when cutting edge 8a is significantly distant from target excavation topography U above target excavation topography U, intervention control of an operation of work implement 2 is not carried out.

When distance d is smaller than prescribed value dth1, intervention control of an operation of work implement 2 is carried out. Specifically, when distance d is smaller than prescribed value dth1, intervention control of an operation of boom 6 is carried out.

A scheme for calculating boom target speed Vc_bm_lmt with the use of perpendicular speed components Vcy_am and Vcy_bkt found as described above and the speed limit table for work implement 2 as a whole will now be described.

Figure 11:
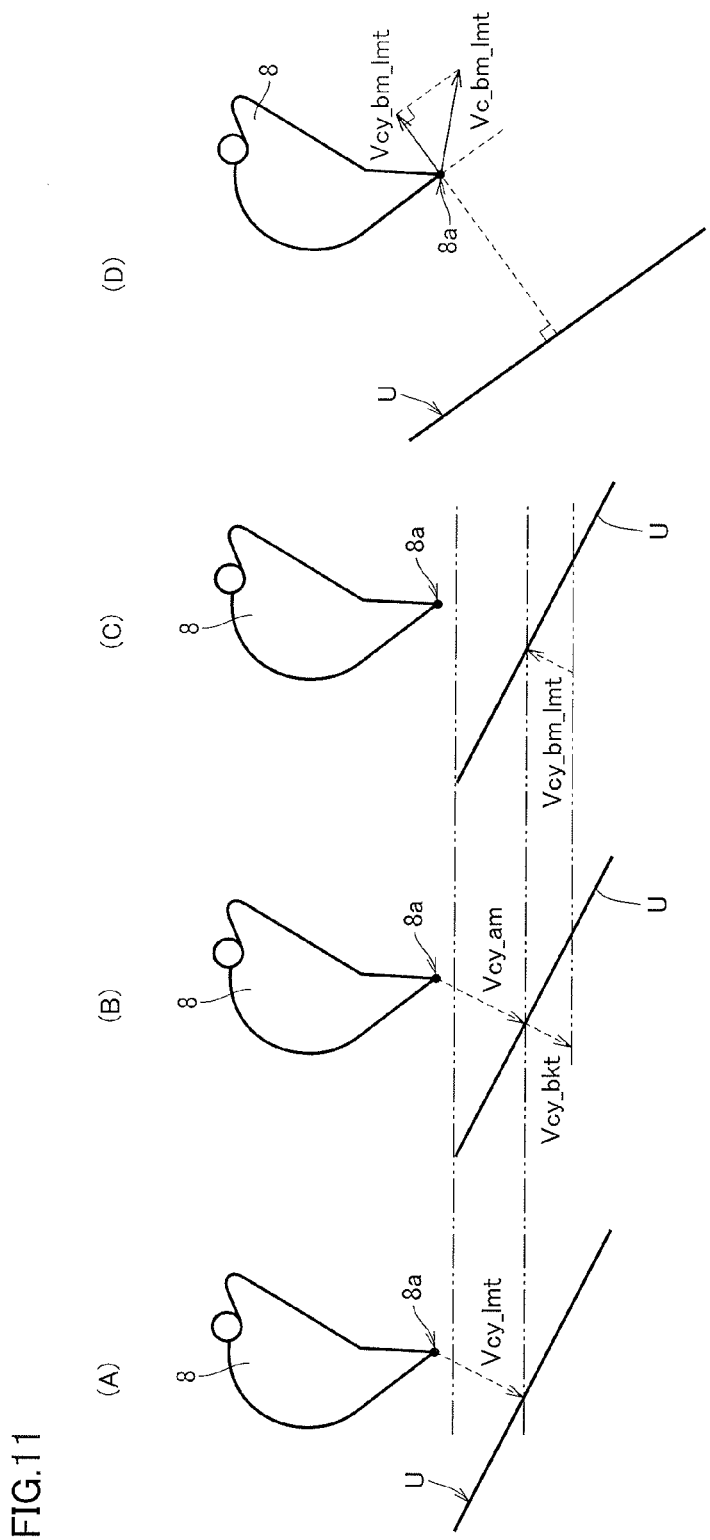
FIG. 11 is a diagram illustrating a scheme for calculating a boom target speed Vc_bm_lmt based on the embodiment.

FIGS. 11 (A) to 11 (D) are diagrams illustrating a scheme for calculating boom target speed Vc_bm_lmt.

As shown in FIG. 11 (A), target speed determination portion 54 (FIG. 6) calculates speed limit Vcy_lmt of work implement 2 as a whole in accordance with the speed limit table. Speed limit Vcy_lmt of work implement 2 as a whole is a moving speed of cutting edge 8a allowable in a direction in which cutting edge 8a of bucket 8 comes closer to target excavation topography U.

FIG. 11 (B) shows perpendicular speed component Vcy_am of arm estimated speed Vc_am and perpendicular speed component Vcy_bkt of bucket estimated speed Vc_bkt.

As described with reference to FIG. 9, target speed determination portion 54 can calculate perpendicular speed component Vcy_am of arm estimated speed Vc_am and perpendicular speed component Vcy_bkt of bucket estimated speed Vc_bkt based on arm estimated speed Vc_am and bucket estimated speed Vc_bkt.

FIG. 11 (C) shows calculation of a target perpendicular speed component Vcy_bm_lmt of boom 6. Specifically, target perpendicular speed component Vcy_bm_lmt of boom 6 is calculated by subtracting perpendicular speed component Vcy_am of arm estimated speed Vc_am and perpendicular speed component Vcy_bkt of bucket estimated speed Vc_bkt from speed limit Vcy_lmt of work implement 2 as a whole.

FIG. 11 (D) shows calculation of boom target speed Vc_bm_lmt based on target perpendicular speed component Vcy_bm_hart of boom 6.

When speed limit Vcy_lmt of work, implement 2 as a whole is smaller than the sum of perpendicular speed component Vcy_am of the arm estimated speed and perpendicular speed component Vcy_bkt of the bucket estimated speed, target perpendicular speed component Vcy_bm_lmt of boom 6 has a positive value, which means the boom being raised.

Since boom target speed Vc_bm_lmt has a positive value, work implement controller 26 carries out intervention control and causes boom 6 to be raised even though operation apparatus 25 is operated in a direction for lowering boom 6. Therefore, expansion of invasion into target excavation topography U can quickly be suppressed.

When speed limit Vcy_lmt of work implement 2 as a whole is greater than the sum of perpendicular speed component Vcy_am of the arm estimated speed and perpendicular speed component Vcy_bkt of the bucket estimated speed, target perpendicular speed component Vcy_bm_lmt of boom 6 has a negative value, which means the boom being lowered.

Since boom target speed Vc_bm_lmt has a negative value, boom 6 lowers.

[Generation of Control Command CBI]

Figure 12:
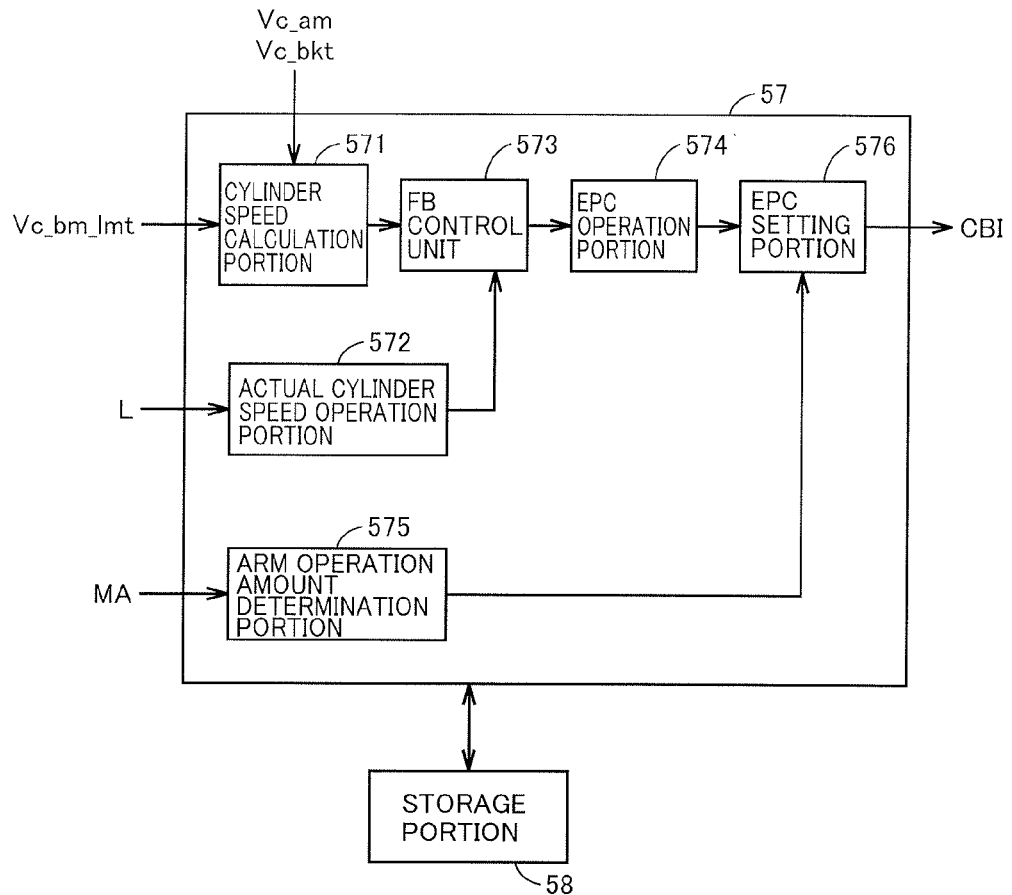
FIG. 12 is a functional block diagram showing a configuration of a work implement control unit 57 based on the embodiment.

FIG. 12 is a functional block diagram showing a configuration of work implement control unit 57 based on the embodiment.

As shown in FIG. 12, work implement control unit 57 has a cylinder speed calculation portion 571, an actual cylinder speed operation portion 572, a feedback (FB) control unit 573, an EPC operation portion 574, an arm operation amount determination portion 575, and an EPC setting portion 576.

Work implement control unit 57 outputs control command CBI to control valve 27 such that boom 6 is driven at boom target speed Vc_bm_lmt when intervention control is carried out.

Cylinder speed calculation portion 571 calculates a cylinder speed of hydraulic cylinder 60. Specifically, cylinder speed calculation portion 571 calculates an estimated speed of boom cylinder 10 in accordance with boom target speed Vc_bm_lmt based on an estimated speed table showing relation between a speed of cutting edge 8a of bucket 8 and a speed of hydraulic cylinder 60. Estimated speeds of arm cylinder 11 and bucket cylinder 12 are calculated by estimated speed determination portion 52 (FIGS. 6 and 8) based on an arm operation command (pressure MA) and a bucket operation command (pressure MT).

Actual cylinder speed operation portion 572 calculates actual cylinder speeds of boom cylinder 10, arm cylinder 11, and bucket cylinder 12, based on cylinder length data L detected by a cylinder stroke sensor (for example, 16) and derived by sensor controller 30 (FIG. 6) and a time period of measurement.

Feedback (FB) control unit 573 carries out feedback control for increasing and decreasing a target speed of hydraulic cylinder 60 based on comparison between an estimated speed of hydraulic cylinder 60 and an actual cylinder speed. Feedback (FB) control unit 573 makes correction for lowering a target speed of hydraulic cylinder 60 when the actual cylinder speed is higher than the estimated speed of hydraulic cylinder 60. Feedback (FB) control unit 573 makes correction for increasing a target speed of hydraulic cylinder 60 when the actual cylinder speed is lower than the estimated speed of hydraulic cylinder 60.

EPC operation portion 574 performs operation processing of a command current set value SV instructing an opening of control valve 27 based on the target speed of hydraulic cylinder 60 corrected by feedback (FB) control unit 573. Specifically, EPC operation portion 574 performs operation processing of command current set value SV based on correlation data stored in advance in storage portion 58.

Figure 13:
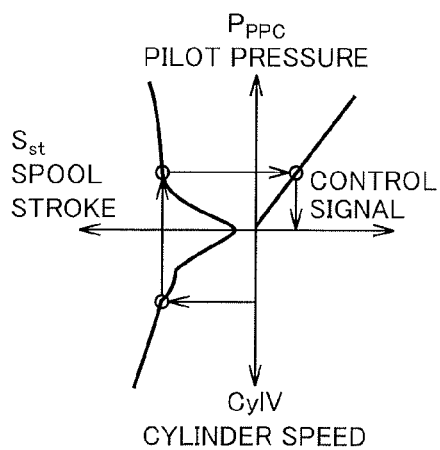
FIG. 13 is a diagram illustrating relation between a cylinder speed of a hydraulic cylinder 60 and an EPC current value.

FIG. 13 is a diagram illustrating relation between a cylinder speed of hydraulic cylinder 60 and an EPC current value. Storage portion 58 stores correlation data showing relation between a cylinder speed of hydraulic cylinder 60 and an amount of movement of spool 80, correlation data showing relation between an amount of movement of spool 80 and a PPC pressure controlled by control valve 27, and correlation data showing relation between a PPC pressure and a control signal (an EPC current) output from work implement control unit 57. The correlation data is found based on experiments or simulations and stored in advance in storage portion 58.

As described above, a cylinder speed of hydraulic cylinder 60 is adjusted based on an amount of supply of the hydraulic oil per unit time which is supplied from the main hydraulic pump through direction control valve 64. Direction control valve 64 has movable spool 80. An amount of supply of the hydraulic oil per unit time to hydraulic cylinder 60 is adjusted based on an amount of movement of spool 80. Therefore, a cylinder speed and an amount of movement of the spool (a spool stroke) correlate with each other.

An amount of movement of spool 80 is adjusted based on a pressure of oil path 452 (a pilot oil pressure) controlled by operation apparatus 25 or by means of control valve 27. The pilot oil pressure of oil path 452 is a pressure of the pilot oil in oil path 452 for moving the spool and regulated by operation apparatus 25 or by means of control valve 27. A pressure of a pilot oil for moving spool 80 is also referred to as a PPC pressure. Therefore, an amount of movement of the spool and a PPC pressure correlate with each other.

Control valve 27 operates based on a control signal (an EPC current) output from work implement control unit 57 of work implement controller 26. Therefore, a PPC pressure and an EPC current correlate with each other.

In intervention control, EPC operation portion 574 calculates command current set value SV corresponding to boom target speed Vc_bm_lmt calculated by target speed determination portion 54. Thus, work implement controller 26 can control boom 6 such that cutting edge 8*a* of bucket 8 does not enter target excavation topography U.

Arm operation amount determination portion 575 determines an amount of operation of second control lever 25L corresponding to an operation of arm 7.

Figure 14:
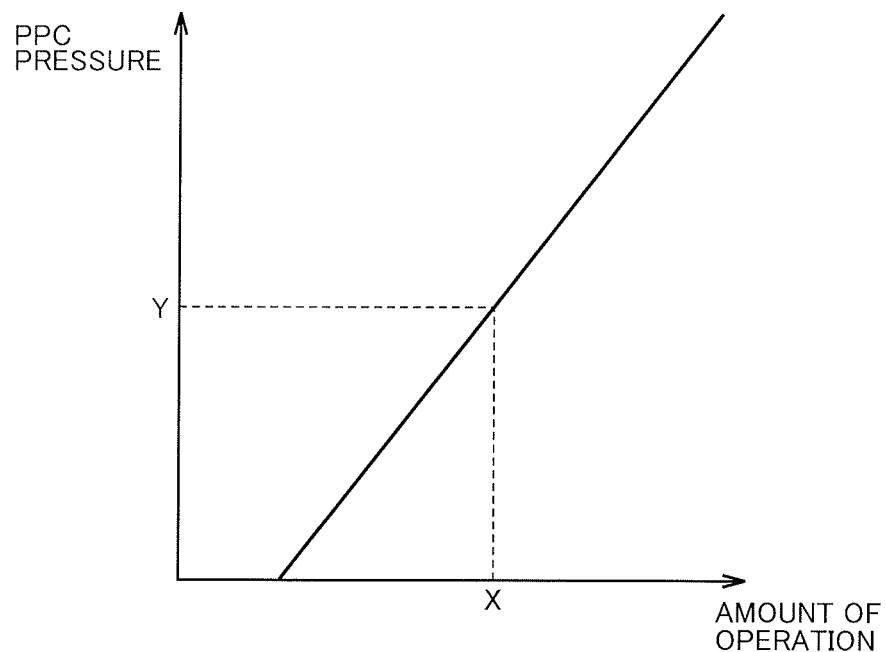
FIG. 14 is a diagram illustrating relation between an amount of operation of a second control lever 25L and a PPC pressure based on the embodiment.

FIG. 14 is a diagram illustrating relation between an amount of operation of second control lever 25L and a PPC pressure based on the embodiment. As shown in FIG. 14, a PPC pressure increases with increase in an amount of operation of second control lever 25L. A margin is provided around the amount of operation of 0, and the PPC pressure linearly increases from a certain amount of operation.

In the present example, a range in which an amount of operation of second control lever 25L is equal to or smaller than a prescribed value X is referred to as a fine operation region in which an operation of the arm through second control lever 25L is a fine operation. A PPC pressure has a maximum value Y in the fine operation region. A region in which an amount of operation of second control lever 25L is greater than prescribed value X is also referred to as a normal operation region.

Arm operation amount determination portion 575 determines an amount of operation of second control lever 25L corresponding to an operation of arm 7. Arm operation amount determination portion 575 determines whether an amount of operation of second control lever 25L is equal to or smaller than prescribed value X, or greater than prescribed value X. In the present example, a state that an amount of operation of second control lever 25L is equal to or smaller than prescribed value X is referred to as a first operation state. A state that an amount of operation of second control lever 25L is greater than prescribed value X is referred to as a second operation state. Arm operation amount determination portion 575 determines whether second control lever 25L is in the first operation state or the second operation state.

EPC setting portion 576 sets an EPC current value to be output to control valve 27, based on command current set value SV calculated by EPC operation portion 574 and an operation state determined by arm operation amount determination portion 575 (the first operation state or the second operation state). EPC setting portion 576 outputs the set EPC current value to control valve 27 as control command CBI.

Figure 15:
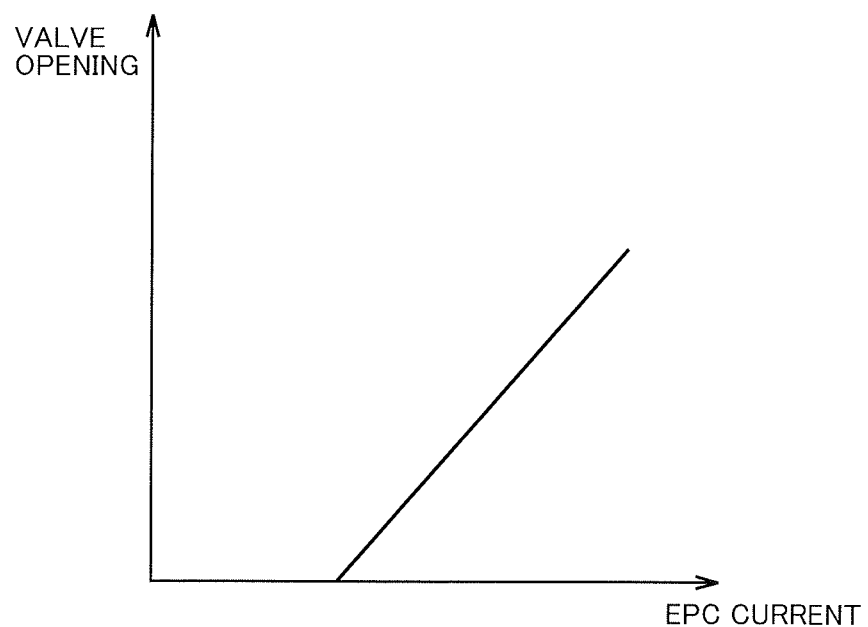
FIG. 15 is a diagram illustrating relation between an EPC current value and an opening of a control valve 27 based on the embodiment.

FIG. 15 is a diagram illustrating relation between an EPC current value and an opening of control valve 27 based on the embodiment. Control valve 27 is such a valve that its opening is zero (fully closed) when an EPC current value is zero and the opening thereof continuously increases with increase in EPC current value.

As shown in FIG. 15, an opening of control valve 27 is adjusted by an EPC current value. FIG. 15 shows increase in opening of control valve 27 with increase in EPC current value. A margin is provided around an EPC current value of 0, and an opening of control valve 27 linearly increases from a certain current value. Therefore, an EPC current value and an opening of control valve 27 correlate with each other.

Figure 16:
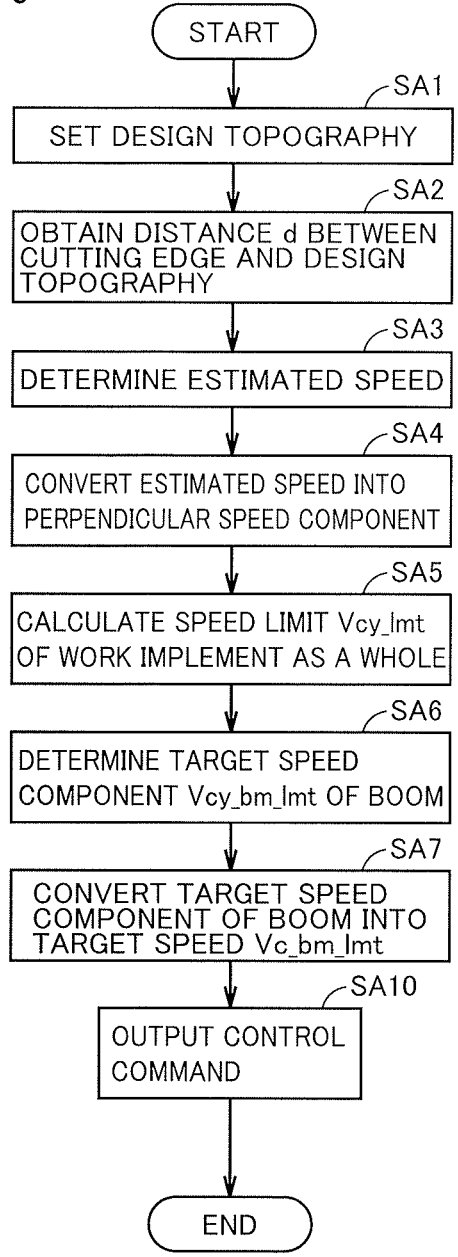
FIG. 16 is a flowchart illustrating profile control (excavation limit control) of work vehicle 100 based on the embodiment.

FIG. 16 is a flowchart illustrating profile control (excavation limit control) of work vehicle 100 based on the embodiment.

As shown in FIG. 16, initially, design topography is set (step SA1). Specifically, target excavation topography U is set by target excavation topography data generation portion 28C of display controller 28.

Then, distance d between the cutting edge and the design topography is obtained (step SA2). Specifically, distance obtaining portion 53 calculates distance d shortest between cutting edge 8*a* of bucket 8 and the surface of target excavation topography U based on target excavation topography U and information on a position of cutting edge 8*a* in accordance with bucket position data S from bucket position data generation portion 28B.

Then, an estimated speed is determined (step SA3). Specifically, estimated speed determination portion 52 of work implement controller 26 determines arm estimated speed Vc_am and bucket estimated speed Vc_bkt. Arm estimated speed Vc_am refers to a speed of cutting edge 8*a* in a case that only arm cylinder 11 is driven. Bucket estimated speed Vc_bkt refers to a speed of cutting edge 8a in a case that only bucket cylinder 12 is driven.

Arm estimated speed Vc_am and bucket estimated speed Vc_bkt are calculated based on an operation command (pressures MA and MT) from operation apparatus 25 in accordance with various tables stored in storage portion 58.

Then, the estimated speed is converted into a perpendicular speed component (step SA4). Specifically, target speed determination portion 54 converts arm estimated speed Vc_am and bucket estimated speed Vc_bkt into speed components Vcy_am and Vcy_bkt perpendicular to target excavation topography U, as described with reference to FIG. 9.

Then, speed limit Vcy_lmt of work implement 2 as a whole is calculated (step SM). Specifically, target speed determination portion 54 calculates speed limit. Vcy_lmt in accordance with the speed limit table, based on distance d.

Then, target perpendicular speed component Vcy_bm_lmt of the boom is determined (step SA6). Specifically, target speed determination portion 54 calculates perpendicular speed component Vcy_bm_lmt of the target speed of boom 6 (a target perpendicular speed component) from speed limit Vcy_lmt of work implement 2 as a whole, arm estimated speed Vc_am, and bucket estimated speed Vc_bkt as described with reference to FIG. 11.

Then, target perpendicular speed component Vcy_bm_lmt of the boom is converted into target speed Vc_bm_lmt (step SA7). Specifically, target speed determination portion 54 converts target perpendicular speed component Vcy_b-m_lmt of boom 6 into target speed of boom 6 (a boom target speed) Vc_bm_lmt as described with reference to FIG. 11.

Then, EPC operation portion 574 calculates command current set value SV based on boom target speed Vc_bm_lmt and an EPC current set by EPC setting portion 576 is output to control valve 27 as control command CBI (step SA10). Thus, work implement controller 26 can control boom 6 such that cutting edge 8a of bucket 8 does not enter target excavation topography U.

Then, the process ends (end).

Thus, in the present example, work implement controller 26 controls a speed of boom 6 such that a relative speed at which bucket 8 comes closer to target excavation topography U is smaller in accordance with distance d between target excavation topography U and cutting edge 8a of bucket 8, based on target excavation topography U representing the design topography which is an aimed shape of an excavation target and bucket position data S representing a position of cutting edge 8a of bucket 8.

Work implement controller 26 determines a speed limit of work implement 2 as a whole in accordance with distance d between target excavation topography U and cutting edge 8a of bucket 8 based on target excavation topography U representing the design topography which is an aimed shape of an excavation target and bucket position data S representing a position of cutting edge 8a of bucket 8 and controls work implement 2 such that a speed in a direction in which work implement 2 comes closer to target excavation topography U is equal to or lower than the speed limit. Thus, profile control (excavation limit control) is carried out and a speed of the boom cylinder is adjusted. According to such a scheme, a position of cutting edge 8a with respect to target excavation topography U is controlled, entry of cutting edge 8a into target excavation topography U is suppressed, and profile work making a surface in accordance with the design topography can be performed.

[First Embodiment for Adjustment of Arm Excavation EPC Current]

By operating arm 7 by operating second control lever 25L of operation apparatus 25, profile work in which soil abutting to cutting edge 8a of bucket 8 is plowed and leveled and a surface corresponding to flat design topography is made can be performed.

When second control lever 25L is operated, cutting edge 8a of bucket 8 may fall due to its self weight.

When fall of bucket 8 due to its self weight occurs, hydraulic cylinder 60 may operate at a speed equal to or higher than an estimated speed of hydraulic cylinder 60 in accordance with an amount of operation by which second control lever 25L is operated (an amount of operation of the arm), which is calculated by estimated speed determination portion 52.

Deviation between an estimated speed of hydraulic cylinder 60 estimated based on an amount of operation of this second control lever 25L and an actual speed is great in a fine operation in which an amount of operation of second control lever 25L is small.

Consequently, excessive feedback control by feedback (FB) control unit 573 may be carried out.

Specifically, when an actual speed being greater than the estimated speed of arm cylinder 11 is detected, correction for lowering the target speed is made in order to lower the cylinder speed, and consequently an EPC current value output to control valve 27 decreases. When the EPC current value excessively decreases here, the actual speed becomes lower than the estimated speed of arm cylinder 11. When an actual speed being, lower than the estimated speed of arm cylinder 1i is detected, correction for increasing the target speed is made in order to increase the cylinder speed, and consequently an EPC current value output to control valve 27 increases.

Figure 17:
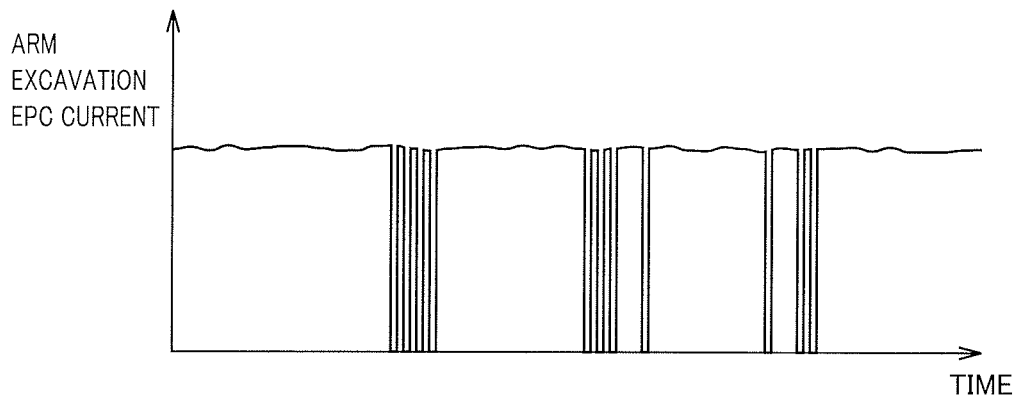
FIG. 17 is a graph showing an EPC current value during an operation for excavation by an arm in the work vehicle before application of the present invention.

FIG. 17 is a graph showing an EPC current value during an operation for excavation by the arm in the work vehicle before application of the present invention.

The abscissa in the graph in FIG. 17 represents time. The ordinate represents an EPC current value output to control valve 27B at the time when arm cylinder 11 is extended to have arm 7 perform an excavation operation, which is referred to as an arm excavation EPC current.

As shown in FIG. 17, a value for the arm excavation EPC current repeats sharp decrease and increase in a specific time period. Sharp increase and decrease in arm excavation EPC current leads to an unstable behavior of arm 7. Consequently, cutting edge 8a of bucket 8 is not stabilized and hunting may occur.

In the embodiment, a scheme for suppressing increase and decrease in value for an arm excavation EPC current will be described.

Figure 18:
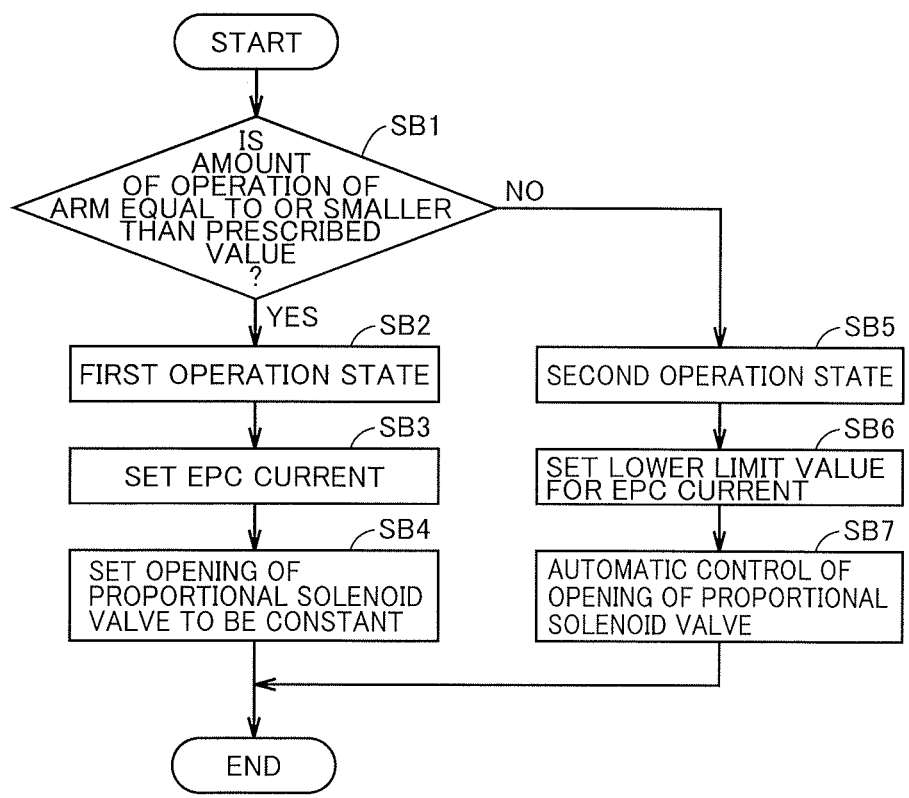
FIG. 18 is a flowchart illustrating control of an arm excavation EPC current based on a first embodiment.

FIG. 18 is a flowchart illustrating control of an arm excavation EPC current based on a first embodiment.

As shown in FIG. 18, initially, whether or not an amount of operation of second control lever 25L corresponding to an operation of arm 7 is equal to or smaller than prescribed value X is determined (step SB1). Specifically, arm operation amount determination portion 575 calculates an amount of operation of second control lever 25L based on a PPC pressure detected by pressure sensor 66 in accordance with a table showing relation between an amount of operation of second control lever 25L and a PPC pressure, which is stored in storage portion 58. Arm operation amount determination portion 575 further determines whether or not the calculated amount of operation of second control lever 25L is equal to or smaller than prescribed value X.

When it is determined in step SB1 that the amount of operation of second control lever 25L is equal to or smaller than prescribed value X (YES in step SB1), the process proceeds to step SB2, which means that the first operation state in which the amount of operation of second control lever 25L is equal to or smaller than prescribed value X is established.

Then, an EPC current is set (step SB3). Specifically, EPC setting portion 576 sets an arm excavation EPC current to be output to control valve 27 to a constant value in the first operation state. Thus, an opening of control valve 27B provided in oil path 450 is set to be constant (step SB4).

Figure 19:
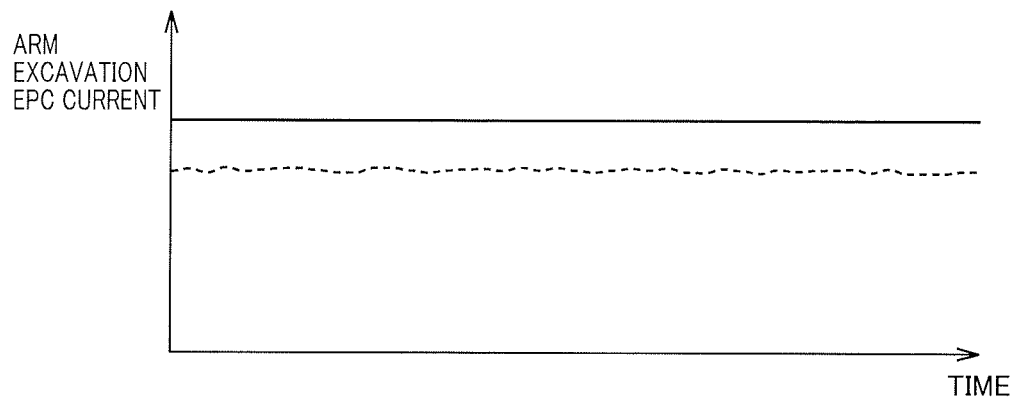
FIG. 19 is a graph showing an EPC current value during an operation for excavation by the arm in the work vehicle in the first embodiment.

FIG. 19 is a graph showing an EPC current value during an operation for excavation by the arm in the work vehicle in the first embodiment. The abscissa in the graph in FIG. 19 represents time. The ordinate in the graph in FIG. 19 represents an arm excavation EPC current as in FIG. 17.

A solid line in FIG. 19 represents a value for an arm excavation EPC current output from EPC setting portion 576 to control valve 27. A dashed line in FIG. 19 represents command current set value SV set in accordance with an amount of operation of second control lever 25L which is operated by EPC operation portion 574.

As shown in FIG. 19, in the first embodiment, EPC setting portion 576 sets an arm excavation EPC current to a constant value. A value for the arm excavation EPC current set by EPC setting portion 576 is always greater than command current set value SV set in accordance with the amount of operation of second control lever 25L.

Figure 20:
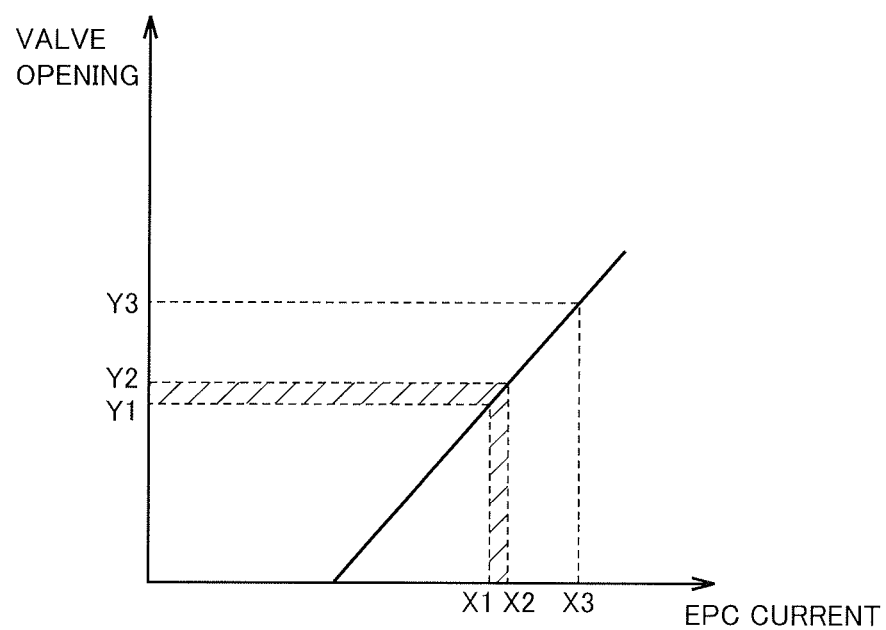
FIG. 20 is a diagram illustrating an opening of control valve 27 in the first embodiment.

FIG. 20 is a diagram illustrating an opening of control valve 27 in the first embodiment. FIG. 20 illustrates relation between an EPC current value and an opening of control valve 27 described with reference to FIG. 15.

As described above with reference to FIG. 19, a value for the arm excavation EPC current set by EPC setting portion 576 is greater than command current set value SV set in accordance with an amount of operation of second control lever 25L. Values X1 and X2 for an EPC current shown in FIG. 20 represent a minimum value and a maximum value of command current set value SV set in accordance with an amount of operation of second control lever 25L, respectively. A value X3 represents a value for an arm excavation EPC current set by EPC setting portion 576.

Valve openings Y1, Y2, and Y3 shown in FIG. 20 represent openings of control valve 27 corresponding to values X1, X2, and X3 for an EPC current, respectively.

As shown in FIG. 20, an opening of control valve 27 is determined in correspondence with an arm excavation EPC current set by EPC setting portion 576 in the first operation state. An opening of control valve 27 (valve opening Y3) in the first operation state is greater than a maximum value (valve opening Y2) in the first operation state of the opening of control valve 27 set in accordance with an amount of operation of second control lever 25L.

A pilot oil pressure of oil path 451 varies owing to an operation of second control lever 25L. Since an opening of control valve 27 is sufficiently great in the first operation state, the pilot oil pressure of oil path 451 and the pilot oil pressure of oil path 452 are equal to each other. Thus, in the first operation state, a pressure of the pilot oil supplied to direction control valve 64 is regulated in accordance with an amount of operation of second control lever 25L.

Second control lever 25L outputs a hydraulic pressure signal in accordance with an amount of operation of second control lever 25L. In the first operation state, an opening of control valve 27 is set such that a hydraulic pressure signal output from second control lever 25L is guided as it is to direction control valve 64.

Referring back to FIG. 18, when it is determined in step SB1 that the amount of operation of second control lever 25L is greater than prescribed value X (NO in step SB1), the process proceeds to step SB5, which means that the second operation state in which the amount of operation of second control lever 25L is greater than prescribed value X is established.

Then, a lower limit value LL for an EPC current is set (step SB6). Specifically, EPC setting portion 576 sets lower limit value LL for the arm excavation EPC current to be output to control valve 27 in the second operation state. Thus, a value for the arm excavation EPC current to be output to control valve 27 is controlled based on comparison between lower limit value LL and command current set value SV set in accordance with an amount of operation of second control lever 25L, which is operated by EPC operation portion 574.

Therefore, in step SB7, EPC setting portion 576 automatically controls an opening of control valve 27. Specifically, EPC setting portion 576 compares lower limit value LL and command current set value SV with each other. When command current set value SV is equal to or smaller than lower limit value LL as a result of comparison, control command CBI for setting lower limit value LL as an arm excavation EPC current is generated and output to control valve 27. When command current set value SV is greater than lower limit value LL, control command CBI for setting command current set value SV as an arm excavation EPC current is generated and output to control valve 27.

As described above with reference to FIG. 15, a value for an arm excavation EPC current and an opening of control valve 27 correlate with each other. Therefore, by automatically controlling an arm excavation EPC current, an opening of control valve 27 is automatically controlled. A defined pilot oil pressure is supplied to direction control valve 64 in accordance with an opening of control valve 27 and spool 80 moves, so that arm cylinder 11 extends.

Then, the process ends (end).

According to the work vehicle in the first embodiment described above, as shown in FIG. 18, in the first operation state in which an amount of operation of second control lever 25L is equal to or smaller than prescribed value X, EPC setting portion 576 sets an arm excavation EPC current to a constant value.

As described above with reference to FIG. 14, in a range in which an amount of operation of second control lever 25L is equal to or smaller than prescribed value X, an arm operation is a fine operation. In the fine operation region, deviation between an estimated speed of hydraulic cylinder 60 resulting from an operation of the arm through second control lever 25L and an actual cylinder speed is great. When excessive feedback control is consequently carried out, cutting edge 8a of bucket 8 is not stabilized and hunting may occur.

Therefore, in the first operation state, work implement control unit 57 sets an arm excavation EPC current to a constant value and outputs the arm excavation EPC current to control valve 27, regardless of a result of operation of a cylinder speed by feedback (FB) control valve 573. Thus, such a phenomenon that an arm excavation EPC current sharply increases and decreases as a result of excessive feedback control can be avoided.

By outputting a constant arm excavation EPC current to control valve 27 so as to set an opening of control valve 27 to be constant, a behavior of arm 7 can be stabilized. Thus, cutting edge 8a of bucket 8 can be stabilized and therefore hunting can be suppressed.

A PPC pressure at the time when an amount of operation of second control lever 25L is at prescribed value X is not zero but at a value Y as shown in FIG. 14. Though second control lever 25L has a dead zone where no PPC pressure is output around an amount of operation being 0, attention should be paid to the fact that prescribed value X is a value outside the dead zone of second control lever 25L and the first operation state includes a range outside the dead zone.

In the present embodiment, as shown in FIG. 19, a value for an arm excavation EPC current in the first operation state is set to a constant value greater than command current set value SV operated by EPC operation portion 574. Thus, as shown in FIG. 20, an opening of control valve 27 (valve opening Y3) in the first operation state is greater than the maximum value (valve opening Y2) in the first operation state of the opening corresponding to command current set value SV set in accordance with an amount of operation of second control lever 25L.

Control valve 27 operates in order to regulate an amount of supply of the hydraulic oil to arm cylinder 11, as described with reference to FIG. 3. By setting an opening of control valve 27 as in the present embodiment, a pressure of the pilot oil in oil path 451 and a pressure of the pilot oil in oil path 452 are equal to each other. Here, a pilot oil pressure in accordance with an operation by the operator who finely operates arm 7 is supplied to direction control valve 64 as it is, without being regulated by control valve 27.

By doing so, excessive variation in pilot oil pressure caused by control valve 27 which results in an unstable behavior of arm 7 is prevented, and an operation of arm 7 directly in accordance with an operation of second control lever 25L by an operator can be performed. Therefore, cutting edge 8a of bucket 8 is stabilized, hunting can be suppressed, and in addition, operability of arm 7 in response to an operation by an operator can be improved.

In the present embodiment, a value for an arm excavation EPC current is set to a constant value greater than command current set value SV operated by EPC operation portion 574 so as to avoid influence by a result of operation of a cylinder speed in feedback (FB) control unit 573. In the first operation state, control valve 27 may fully be opened. A value for an arm excavation EPC current in the first operation state, however, is preferably set to a value slightly greater than the maximum value of command current set value SV operated by EPC operation portion 574, such that control valve 27 does not abruptly change an opening at the time when transition from the first operation state to the second operation state is made.

[Second Embodiment for Adjustment of Arm Excavation EPC Current]

Figure 21:
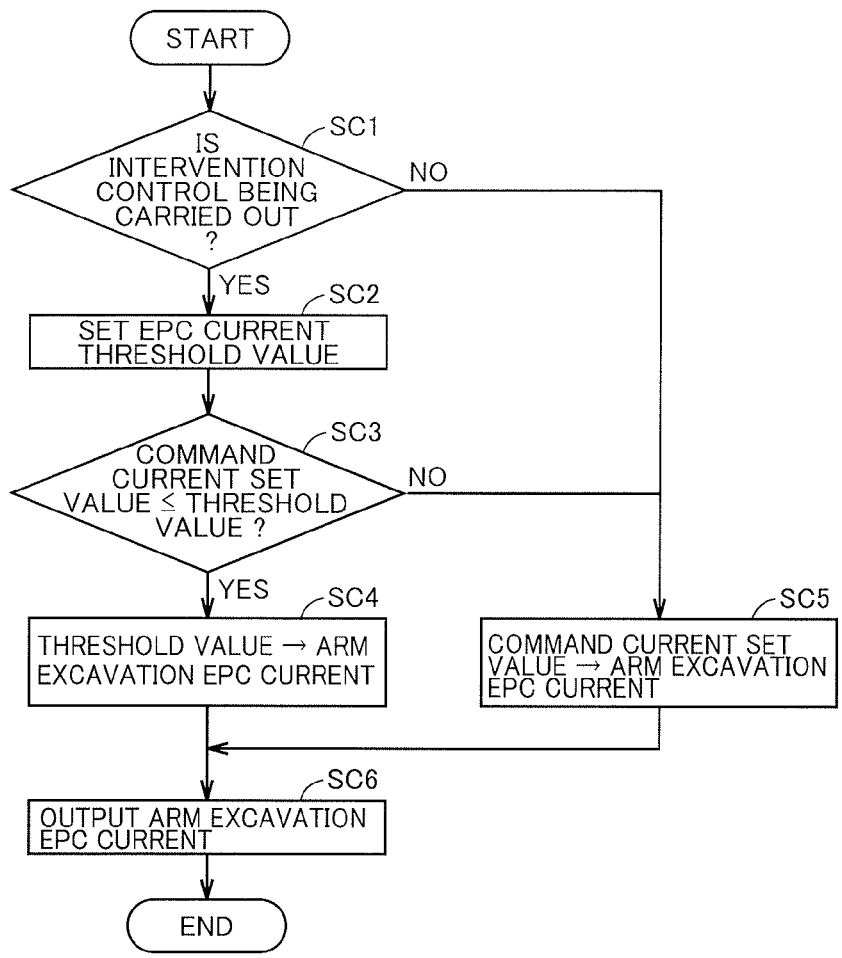
FIG. 21 is a flowchart illustrating control of an arm excavation EPC current based on a second embodiment.

FIG. 21 is a flowchart illustrating control of an arm excavation EPC current based on a second embodiment.

As shown in FIG. 21, initially, whether or not intervention control is being carried out is determined in step SC1. As described above with reference to FIG. 3, when an operator performs an operation of the arm and a distance between the cutting edge of the bucket and design topography and a speed of the cutting edge are within the reference, profile control is carried out. In the case of profile control, intervention control in which boom 6 is controlled so as to suppress entry of cutting edge 8a into design topography is carried out.

When it is determined in step SC1 that intervention control is being carried out (YES in step SC1), a threshold value TH for an EPC current is then set (step SC2). Specifically, EPC setting portion 576 sets threshold value TH associated with an arm excavation EPC current to be output to control valve 27 while intervention control is being carried out.

Then, whether or not command current set value SV is equal to or smaller than threshold value TH is determined (step SC3). Specifically, EPC setting portion 576 determines whether or not command current set value SV is equal to or smaller than threshold value TH, based on comparison between threshold value TH set in step SC2 and command current set value SV set in accordance with an amount of operation of second control lever 25L which is operated by EPC operation portion 574.

When it is determined in step SC3 that command current set value SV is equal to or smaller than threshold value TH (YES in step SC3), the process proceeds to step SC4 and threshold value TH is set as the arm excavation EPC current.

When it is determined in step SC1 that intervention control is not being carried out (NO in step SC1), the process proceeds to step SC5 and command current set value SV is set as the arm excavation EPC current. When it is determined in step SC3 that command current set value SV is greater than threshold value TH (NO in step SC3), the process proceeds to step SC5 and command current set value SV is set as the arm excavation EPC current.

Then, the arm excavation EPC current is output to control valve 27 (step SC6). Specifically, when command current set value SV is equal to or smaller than threshold value TH while intervention control is being carried out, EPC setting portion 576 generates control command CBI for setting threshold value TH as the arm excavation EPC current and outputs the control command to control valve 27. When command current set value SV is greater than threshold value TH while intervention control is being carried out and when intervention control is not being carried out, EPC setting portion 576 generates control command CBI for setting command current set value SV set in accordance with an amount of operation of second control lever 25L as the arm excavation EPC current and outputs the control command to control valve 27.

As described above with reference to FIG. 15, a value for an arm excavation EPC current and an opening of control valve 27 correlate with each other. Therefore, by automatically controlling an arm excavation EPC current, an opening of control valve 27 is automatically controlled. A defined pilot oil pressure is supplied to direction control valve 64 in accordance with an opening of control valve 27 and spool 80 moves, so that arm cylinder 11 extends.

Then, the process ends (end).

Figure 22:
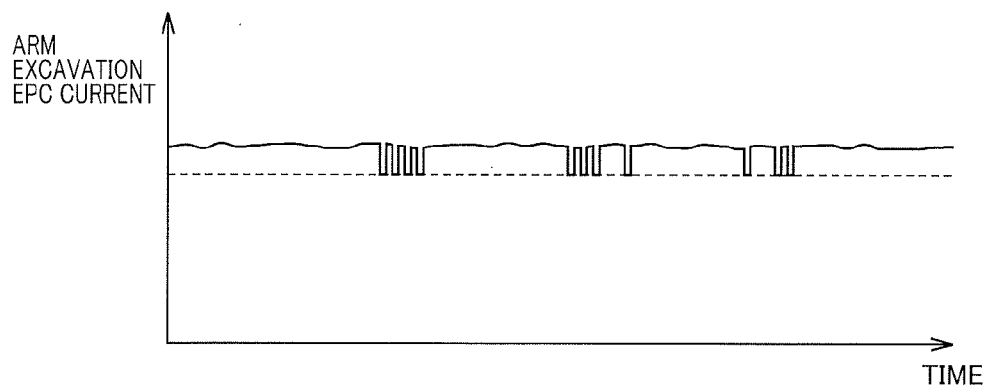
FIG. 22 is a graph showing an EPC current value during an operation for excavation by the arm in the work vehicle in the second embodiment.

FIG. 22 is a graph showing an EPC current value during an operation for excavation by the arm in the work vehicle in the second embodiment. The abscissa in the graph in FIG. 22 represents time. The ordinate in the graph in FIG. 22 represents an arm excavation EPC current as in FIG. 17.

A solid line in FIG. 22 represents a value for an arm excavation EPC current output from EPC setting portion 576 to control valve 27. A dashed line in FIG. 22 represents threshold value TH for an EPC current set by EPC setting portion 576.

As shown in FIG. 22, in the second embodiment, EPC setting portion 576 sets threshold value TH for an arm excavation EPC current. When command current set value SV is equal to or smaller than threshold value TH, threshold value TH is set as the arm excavation EPC current. When command current set value SV is greater than threshold value TH, command current set value SV is set as the arm excavation EPC current.

Threshold value TH is set as a value smaller than the maximum value of command current set value SV set in accordance with an amount of operation of second control lever 25L. By setting threshold value TH as the lower limit value for the arm excavation EPC current, EPC setting portion 576 functions as a low-cut filter for command current set value SV.

Therefore, as shown in FIG. 22, though a value for the arm excavation EPC current repeats sharp decrease and increase in a specific time period, a numeric range within which the arm excavation EPC current increases and decreases is significantly narrower than in FIG. 17.

According to the work vehicle in the second embodiment described above, as shown in FIG. 21, while intervention control is being carried out, when command current set value SV is equal to or smaller than threshold value TH, threshold value TH is output to control valve 27 as the arm excavation EPC current, and when command current set value SV is greater than threshold value TH, command current set value SV is output to control valve 27 as the arm excavation EPC current.

On the other hand, as shown in FIG. 21, while intervention control is not being carried out, command current set value SV is output to control valve 27 as the arm excavation EPC current.

As described above with reference to FIG. 14, in a range where an amount of operation of second control lever 25L is equal to or smaller than prescribed value X, an arm operation is a fine operation. In the fine operation region, deviation between an estimated speed of hydraulic cylinder 60 resulting from an operation of the arm through second control lever 25L and an actual cylinder speed is great. Therefore, when excessive feedback control is carried out, a value for the arm excavation EPC current significantly increases and decreases as shown in FIG. 17, and consequently, cutting edge 8a of bucket 8 is not stabilized and hunting may occur.

Therefore, by providing a low-cut filter for command current set value SV and providing the lower limit value for the arm excavation EPC current, as shown in FIG. 22, a range within which an arm excavation EPC current increases and decreases can be narrowed. Thus, such a phenomenon that an arm excavation. EPC current sharply increases and decreases as a result of excessive feedback control can be avoided.

By decreasing an amount of change in opening of control valve 27 by suppressing variation in arm excavation EPC current, variation in pilot oil pressure supplied to direction control valve 64 can be suppressed and variation in cylinder speed at the time of extension of arm cylinder 11 can be lessened. By stabilizing a behavior of arm 7, cutting edge 8a of bucket 8 can be stabilized and therefore hunting can be suppressed.

Though one embodiment of the present invention has been described above, the present invention is not limited to the embodiment above but various modifications can be made within the scope without departing from the spirit of the invention.

For example, in the present example described above, control is carried out such that variation in value for an arm excavation EPC current involved with feedback control of a cylinder speed is lessened, however, in the fine operation region where an amount of operation of second control lever 25L is equal to or smaller than prescribed value X, feedback control of a cylinder speed may be inactivated.

Operation apparatus 25 is of a pilot hydraulic type. Operation apparatus 25 may be of an electric lever type. For example, a control lever detection portion such as a potentiometer detecting an amount of operation of a control lever of operation apparatus 25 and outputting a voltage value in accordance with the amount of operation to work implement controller 26 may be provided. Work implement controller 26 may adjust a pilot oil pressure by outputting a control signal to control valve 27 based on a result of detection by the control lever detection portion. Present control is carried out by a work implement controller, however, it may be carried out by other controllers such as sensor controller 30.

Though a hydraulic excavator has been exemplified by way of example of a work vehicle in the embodiment above, the present invention may be applied to a work vehicle of other types without being limited to the hydraulic excavator.

A position of a hydraulic excavator in the global coordinate system may be obtained by other positioning means, without being limited to GNSS. Therefore, distance d between cutting edge 8a and design topography may be obtained by other positioning means, without being limited to GNSS.

Though the embodiment of the present invention has been described above, it should be understood that the embodiment disclosed herein is illustrative and non-restrictive in every respect. The scope of the present invention is defined by the terms of the claims, and is intended to include any modifications within the scope and meaning equivalent to the terms of the claims.

REFERENCE SIGNS LIST 1 vehicular main body; 2 work implement; 3 revolving unit; 4 operator's cab; 4S operator's seat; 5 traveling apparatus; 5Cr crawler belt; 6 boom; 7 arm; 8 bucket; 8a cutting edge; 9 engine compartment; 10 boom cylinder; 11 arm cylinder; 12 bucket cylinder; 13 boom pin; 14 arm pin; 15 bucket pin; 16 boom cylinder stroke sensor; 17 arm cylinder stroke sensor; 18 bucket cylinder stroke sensor; 19 handrail; 20 position detection apparatus; 21 antenna; 21A first antenna; 21B second antenna; 23 global coordinate operation portion; 25 operation apparatus; 25L second control lever; 25R first control lever; 26 work implement controller; 27, 27A, 27B, 27C control valve; 28 display controller; 28A target construction information storage portion; 28B bucket position data generation portion; 28C target excavation topography data generation portion; 29, 322 display portion; 30 sensor controller; 32 man-machine interface portion; 40A cap side oil chamber; 40B rod side oil chamber; 51 shuttle valve; 52 estimated speed determination portion; 52A spool stroke operation portion; 52B cylinder speed operation portion; 52C estimated speed operation portion; 53 distance obtaining portion; 54 target speed determination portion; 57 work implement control unit; 58 storage portion; 60 hydraulic cylinder; 63 revolution motor; 64 direction control valve; 65 spool stroke sensor; 66, 67, 68 pressure sensor; 100 work vehicle; 200 control system; 300 hydraulic system; 321 input portion; 450 pilot oil path; 451 upstream oil path; 452 downstream oil path; 571 cylinder speed calculation portion; 572 actual cylinder speed operation portion; 573 feedback control unit; 574 EPC operation portion; 575 arm operation amount determination portion; and 576 EPC setting portion.

The invention claimed is:

1. A work vehicle, comprising:
   a work implement including a boom, an arm, and a bucket;
   an arm cylinder driving said arm;
   a direction control valve including a movable spool and operating said arm cylinder by allowing supply of a hydraulic oil to said arm cylinder as said spool moves;
   an oil path connected to said direction control valve, through which a pilot oil for moving said spool flows;
   a proportional solenoid valve for arm excavation provided in said oil path;
   an arm control member for an operator to operate drive of said arm;
   a determination portion determining whether a first operation state in which an amount of operation of said arm control member is equal to or smaller than a prescribed value or a second operation state in which the amount of operation of said arm control member is greater than the prescribed value is established; and
   a setting portion setting a command current instructing an opening of said proportional solenoid valve for arm excavation, said setting portion outputting a constant command current set value to said proportional solenoid valve for arm excavation in said first operation state regardless of a value of the command current set in accordance with an amount of operation of said arm control member.

2. The work vehicle according to claim 1, wherein
   said arm control member outputs a hydraulic pressure signal in accordance with an operation by said operator, and
   said setting portion sets said command current such that said hydraulic pressure signal output from said arm control member is supplied to said direction control valve in said first operation state without being regulated by said proportional solenoid valve for arm excavation.

3. The work vehicle according to claim 2, wherein
   an opening of said proportional solenoid valve for arm excavation based on said setting portion in said first operation state is greater than a maximum value in said first operation state of the opening of said proportional solenoid valve for arm excavation based on the amount of operation of said arm control member.

4. A work vehicle, comprising:
   a work implement including a boom, an arm, and a bucket;
   an arm cylinder driving said arm;
   a direction control valve having a movable spool and operating said arm cylinder by allowing supply of a hydraulic oil to said arm cylinder as said spool moves;
   an oil path connected to said direction control valve, through which a pilot oil for moving said spool flows;
   a proportional solenoid valve for arm excavation provided in said oil path;
   an arm control member for an operator to operate drive of said arm;
   an estimated cylinder speed determination portion calculating an estimated speed of said arm cylinder based on a speed table showing correlation between an amount of movement of said spool in accordance with an amount of operation of said arm control member and a speed of said arm cylinder;
   a command current operation portion operating a command current set value instructing an opening of said proportional solenoid valve for arm excavation based on the estimated speed of said arm cylinder calculated by said estimated cylinder speed determination portion;
   an intervention control unit carrying out intervention control in which said boom is forcibly raised and a position of a cutting edge of said bucket is restricted to above design topography in accordance with a relative position of said cutting edge with respect to said design topography which shows an aimed shape of a target of work by said work implement; and
   a setting portion outputting, when said command current set value is equal to or smaller than a prescribed value while said intervention control is carried out, said prescribed value to said proportional solenoid valve for arm excavation and outputting, when said command current set value is greater than said prescribed value while said intervention control is carried out, said command current set value to said proportional solenoid valve for arm excavation, and outputting said command current set value to said proportional solenoid valve for arm excavation while said intervention control is not carried out.

* * * * *